United States Patent
Pullamplavil et al.

(10) Patent No.: US 10,171,656 B2
(45) Date of Patent: Jan. 1, 2019

(54) SYSTEMS AND METHODS FOR PROVIDING REAL-TIME ASSISTANCE TO CALL CENTER AGENTS

(71) Applicant: Verizon Patent and Licensing Inc., Arlington, VA (US)

(72) Inventors: Premjith A. Pullamplavil, Carrollton, TX (US); Raja Sri Swaroop Mallampalli, Irving, TX (US); Senthil Muthusamy, Lewisville, TX (US); Sudarshan Chavva, Carrollton, TX (US); Ehssan Ghanem, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 574 days.

(21) Appl. No.: 14/585,035

(22) Filed: Dec. 29, 2014

(65) Prior Publication Data

US 2016/0191709 A1   Jun. 30, 2016

(51) Int. Cl.
*H04M 3/51* (2006.01)
*G10L 25/48* (2013.01)
*G10L 15/26* (2006.01)
*G10L 15/08* (2006.01)

(52) U.S. Cl.
CPC .......... *H04M 3/5133* (2013.01); *G10L 25/48* (2013.01); *G10L 15/26* (2013.01); *G10L 2015/088* (2013.01); *H04M 2201/42* (2013.01); *H04M 2203/357* (2013.01)

(58) Field of Classification Search
CPC ....... H04M 3/5133; H04M 3/22; G10L 25/48; G10L 2015/088; G10L 15/26
See application file for complete search history.

(56) References Cited

U.S. PATENT DOCUMENTS

| | | | |
|---|---|---|---|
| 8,693,644 B1* | 4/2014 | Hodges, Jr. | H04M 3/5175 379/265.06 |
| 2004/0042612 A1* | 3/2004 | Michelson | H04M 3/51 379/265.13 |
| 2005/0149418 A1* | 7/2005 | Erbey | G06Q 30/016 705/35 |
| 2011/0010173 A1* | 1/2011 | Scott | H04M 3/42221 704/235 |
| 2014/0172504 A1* | 6/2014 | Duva | H04M 3/51 705/7.31 |

* cited by examiner

*Primary Examiner* — Antim G Shah

(57) ABSTRACT

A device may capture call data corresponding to call between an agent of a call center and a caller. The device may identify a guidance template based on the call data. The guidance template may include one or more rules and/or information for assisting the agent during the call. The device may generate an agent prompt based on the guidance template and/or provide the guidance prompt to an agent device of the agent. The agent device may receive the guidance prompt and display the guidance prompt to the agent. The agent device may capture additional call data from the call and update the guidance prompt based on the call inputs.

20 Claims, 21 Drawing Sheets

SYSTEMS AND METHODS FOR PROVIDING REAL-TIME ASSISTANCE TO CALL CENTER AGENTS

BACKGROUND

Businesses and other types of organization often include a call center that a customer may call to speak with an agent of the organization and obtain products, services, or information. Call centers often include computer systems that assist agents when interacting with callers by enabling the agent to access account information, process orders, schedule services, etc. However, currently available call center computer systems have various limitations. For example, call center computer systems fail to provide real-time, customizable solutions for assisting an agent during a call.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for assisting a call center agent (also referred to as "agent") when talking with a caller by providing the agent with graphical interface prompts (also referred to as "guidance prompts") about what to say and do while interacting with the caller. The guidance prompts may be customized for a particular type of caller, agent, conversation, product, service, or another aspect of a call, and may include information about the caller (e.g., whether the caller has subscribed to certain services, whether the caller has ordered certain products, etc.), instructions about what the agent should discuss (e.g., products or services that the agent should sell to the caller), ways for the agent to obtain special permission (e.g., from a supervisor) regarding special products or services offered to the caller, and more. The guidance prompts may be presented to the agent in a real-time and in a customizable way since the guidance prompts presented to the agent may be based on an on-going conversation between the caller and agent.

Figure 1A:
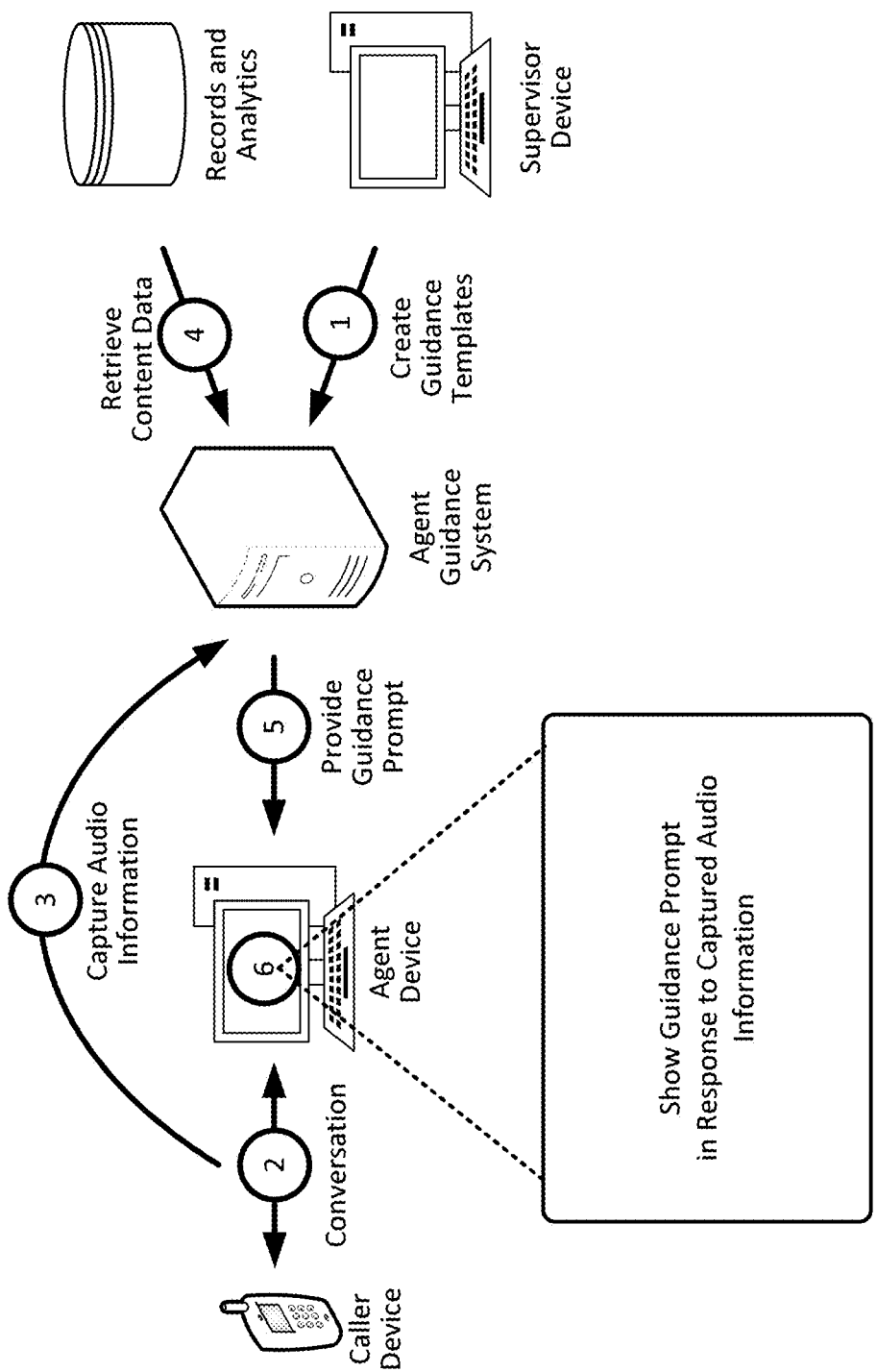
FIG. 1A-1C illustrate an example overview of an implementation described herein.
Figure 1B:
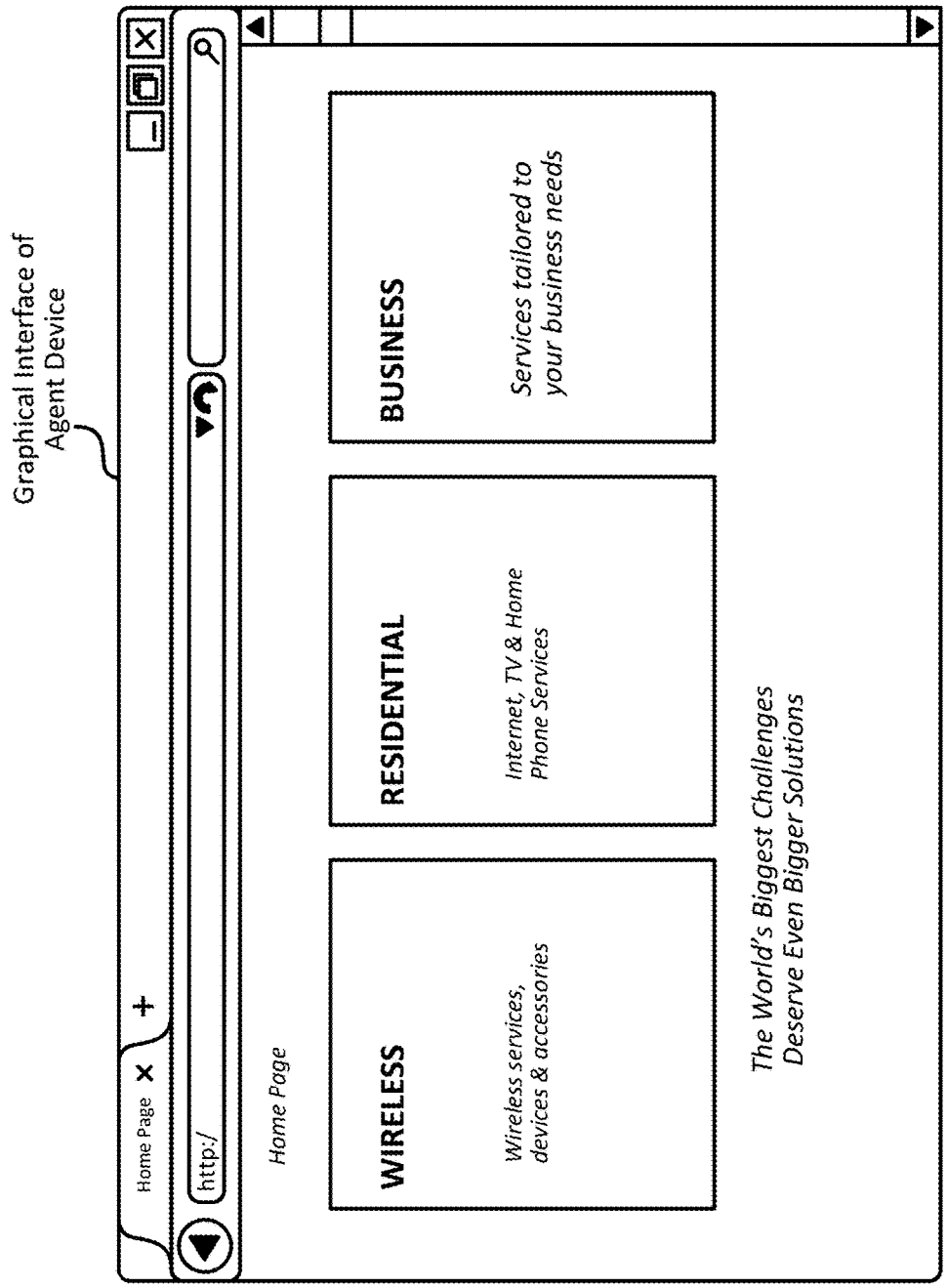
Figure 1C:
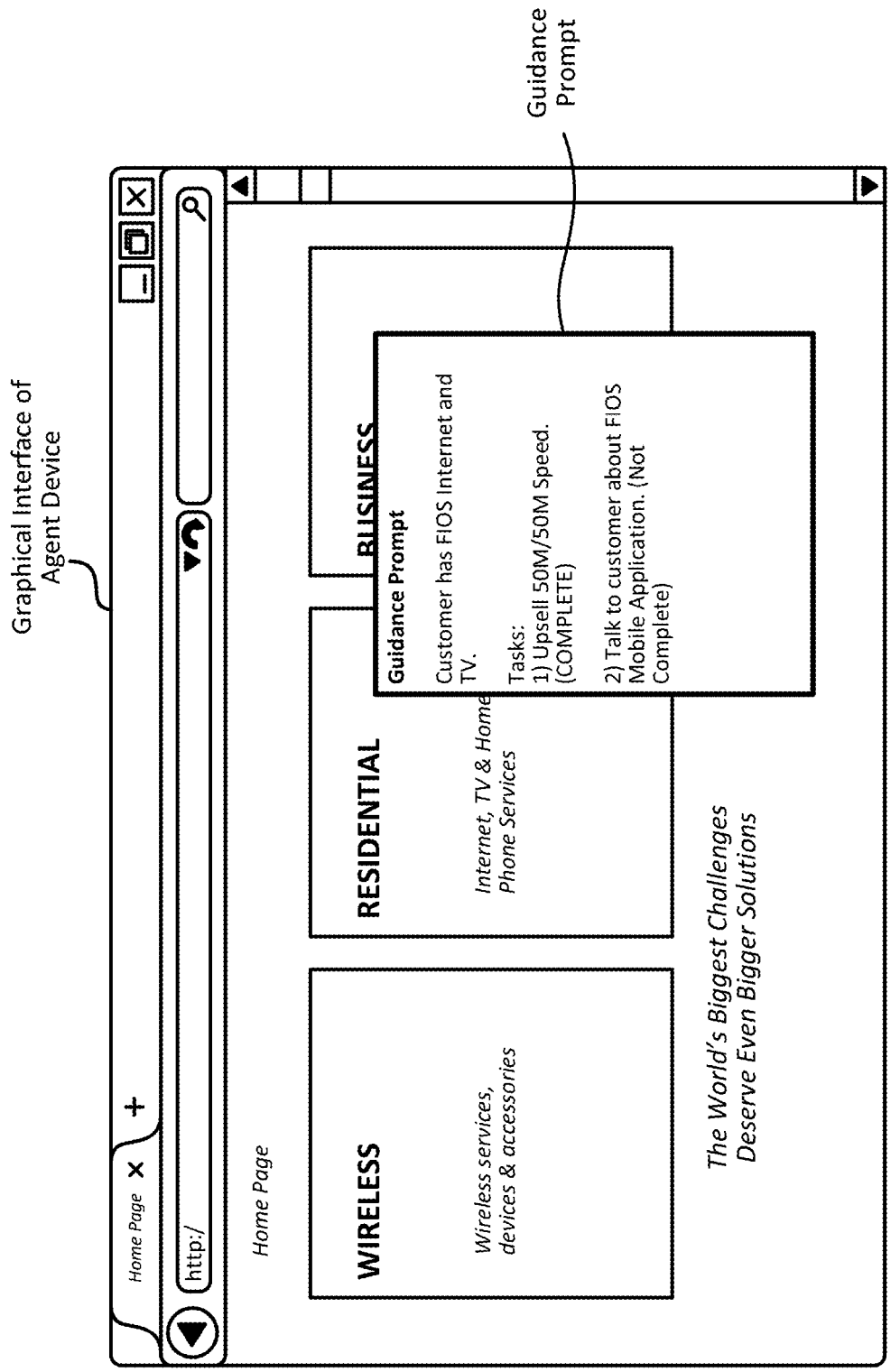

FIGS. 1A-1C illustrate an example overview of an implementation described herein. As shown in FIG. 1A, a call center supervisor may use a supervisor device (e.g., a desktop computer) to communicate with an agent guidance system and generate a guidance template. A guidance template may include one or more rules and/or information for creating a guidance prompt for a particular call scenario. A caller may use a caller device (e.g., a cellular telephone) to call an agent device of the call center and begin a conversation with an agent. The agent device may display a graphical interface to the agent, such as the standard customer account interface shown in FIG. 1B. Audio information from the conversation may be provided to the agent guidance system, and the agent guidance system may use the audio information to identify a guidance template that would be appropriate for the call.

The agent guidance system may obtain information required by the template (e.g., information about the caller, products or services purchased by the caller, etc.) from a records and analytics system and produce a guidance prompt based on the guidance template. The guidance prompt may be communicated to the agent device (e.g., a desktop computer of the agent) and displayed to the agent, as shown in FIG. 1C. The guidance prompt may include one or more types of information, such as information about the caller, tasks that should be completed by the agent (e.g., things that the agent should talk about with the caller), whether the agent has completed the tasks, and more. As the conversation between the caller and the agent proceeds, the agent guidance system may continue providing guidance prompts to the agent device based on the conversation, and the agent device may display the guidance prompts and track whether tasks in the guidance prompts have been completed. As such, systems and/or methods described herein provide solutions for assisting call center agents in a real-time and customizable manner by dynamically providing agents with customized guidance prompts during conversations with callers.

Figure 2:
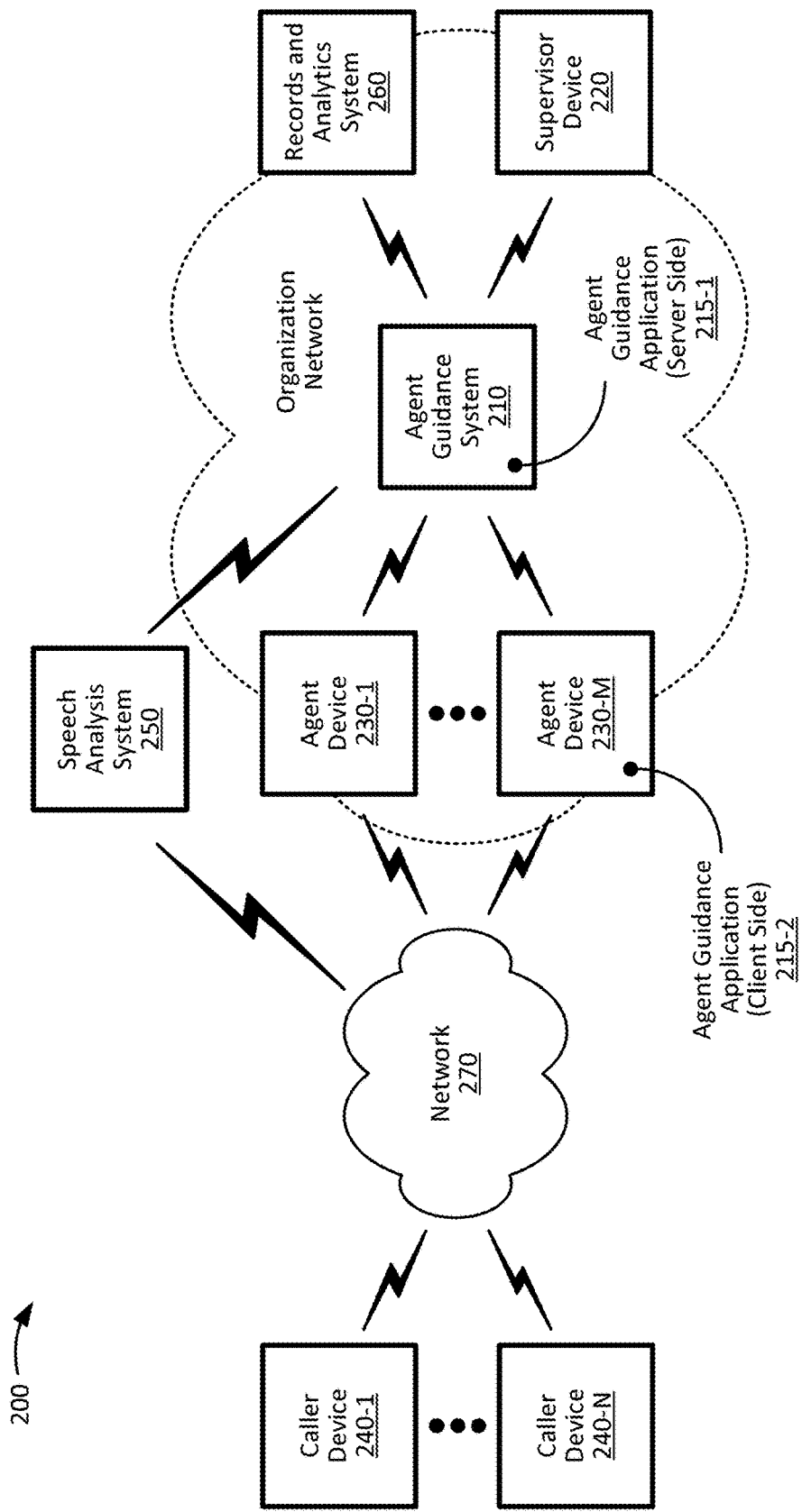
FIG. 2 illustrates an example environment in which systems and/or methods, described herein, may be implemented.

FIG. 2 illustrates an example environment in which systems and/or methods, described herein, may be implemented. As shown in FIG. 2, environment 200 may include agent guidance system 210, supervisor device 220, agent devices 230-1 through 230-M (where M is an integer greater than or equal to 1), caller devices 240-1 through 240-N (where N is an integer greater than or equal to 1), speech analysis system 250, record and analytics system 260, and network 270.

Agent guidance system 210 may include one or more computing devices, such as a server device or a collection of server devices. As shown, agent guidance system 210 may be part of a network of an organization, such as a call center, and/or may be capable of communicating with one or more devices, such as supervisor device 220, agent devices 230, speech analysis device 250, and/or records and analytics system 260. Agent guidance system 210 may include a server-side version of agent guidance application 215-1 that may enable agent guidance system 210 to receive information and instructions from supervisor device 220 for generating guidance templates. A guidance template may include logical rules and/or information for producing a guidance prompt that may assist an agent in communicating with a caller during a call.

Agent guidance application 215-1 may also, or alternatively, enable agent guidance system 210 to receive call data from speech analysis system 250 regarding an ongoing conversation between an agent (e.g., of agent device 230) and a caller (e.g., of caller device 240) and identify an appropriate guidance template based on the call data. Additionally, or alternatively, agent guidance system 210 may produce a guidance prompt based on the guidance template, the conversation between the agent and the caller, and/or information received from records and analytics system 260 (e.g., information regarding the caller, products or services purchased by the caller, etc.), and/or may provide the guidance prompt to agent device 230. In some implementations, agent guidance system 210 may generate multiple guidance prompts, which may include multiple guidance templates, over the course of a single conversation between an agent and a caller.

Supervisor device 220 may include one or more computing devices, such as a laptop computer, a desktop computer, a tablet computer, etc. Supervisor device 220 may be assigned to a particular individual within an organization, such as a supervisor of a call center. In some implementations, supervisor device 220 may operate as a computer terminal for agent guidance system 210. For instance, supervisor device 220 may provide a supervisor with a graphical interface for causing agent guidance system 210 to generate guidance templates. In some implementations, supervisor device 220 may also, or alternatively, be capable of communicating with agent device 230 to, for example, provide assistance, instructions, and/or permissions to an agent regarding a call.

Agent device 230 may include a device capable of communicating via a network, such as network 270. For example, agent device 230 may include one or more computing devices, such as a laptop computer, a desktop computer, a table computer, etc. Agent device 230 may be assigned to a particular individual within an organization, such as an agent within a call center. In some implementations, agent device 230 may provide an agent with access to one or more line-of-business (LOB) applications, which may include one or more types of applications that are central to the services and/or processes of the organization. Examples of a LOB application may include a website run by an organization, an application for an account of the caller (e.g., a customer account), an application for ordering products or services, an application for providing technical support to the caller, an application for executing financial transactions, an application for logging complaints from the caller, etc. Agent device 230 may include a client-side version of agent guidance application 215-2, which may enable agent device 230 to receive a guidance prompt from agent guidance system 210, display the guidance prompts to an agent, enable the agent to contact a supervisor, etc.

Caller device 240 may include a device capable of communicating via a network, such as network 270. For example, caller device 240 may correspond to a mobile communication device (e.g., a smartphone, or a personal digital assistant (PDA)), a portable computer device (e.g., a laptop computer, a tablet computer, a wearable computer), and/or another type of device. In some implementations, caller device 240 may be capable of establishing a call between a caller of caller device 240 and an agent of agent device 230.

Speech analysis system 250 may include one or more computing devices, such as a server device or a collection of server devices. Speech analysis system 250 may be capable of capturing audio information corresponding to a conversation between a caller of caller device 240 and an agent of agent device 230. Additionally, or alternatively, speech analysis system 250 may analyze the audio information for one or more types of information, such as a word or a phrase spoken during a call, a word or a phrase that is analogous (e.g., synonymous) to a word or a phrase spoken during the call, and/or other types of information that may be indicative of the subject matter of a call. Speech analysis system 250 may provide the audio information and/or analysis of the audio information to agent guidance device 210.

Records and analytics system 260 may include one or more computing devices, such as a server device or a collection of server devices. Records and analytics system 260 may provide information to agent guidance system 210, which may be used as content for generating a guidance prompt based on a guidance template. Examples of such information may include identification information of the caller (e.g., a name, an email address, a street address, a telephone number, etc.), account information of the caller (e.g., an account number, products or services purchased by the caller, products or services owed to the caller, etc.), transaction information (e.g., payments made by the caller, account balances, outstanding bills, etc.), communication history information (e.g., previous instances of the caller calling, topics discussed on previous occasions, decision made on previous occasions, etc.) and more.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
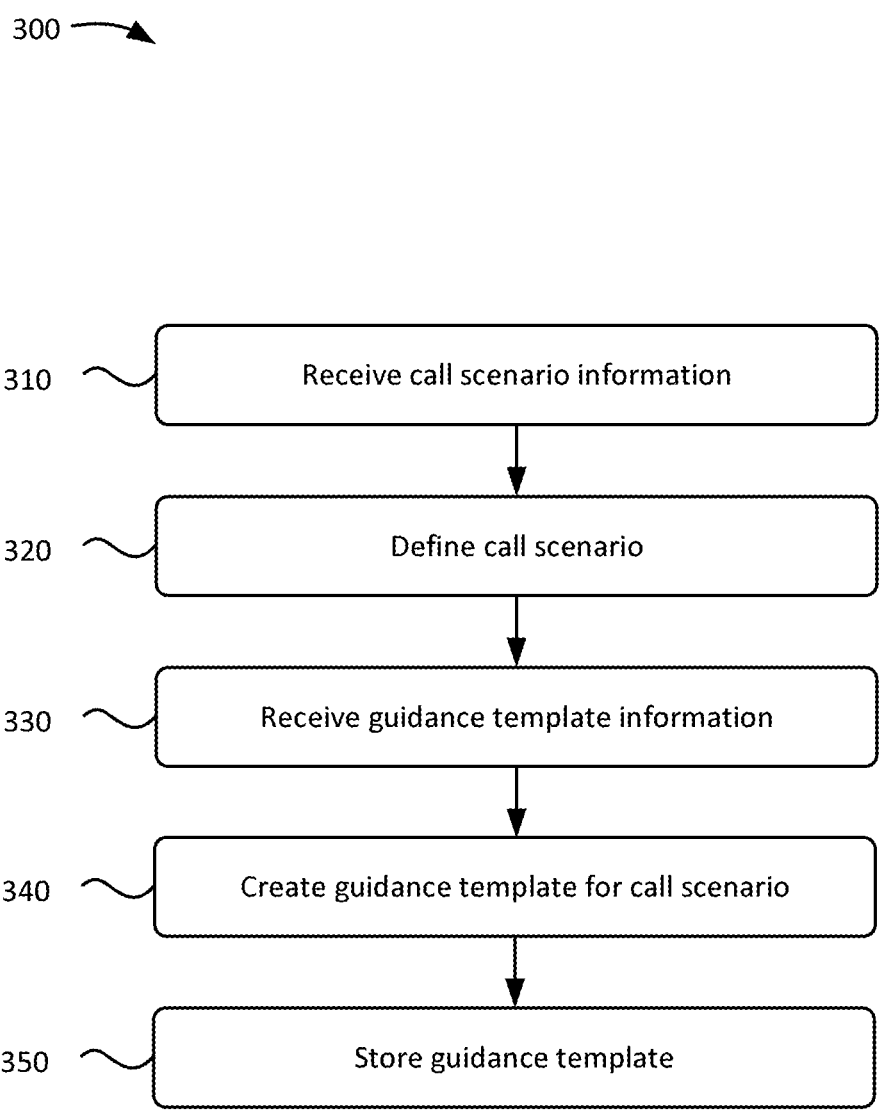
FIG. 3 illustrates a flowchart of an example process for creating a guidance template.

FIG. 3 illustrates a flowchart of an example process 300 for creating a guidance template. In some implementations, process 300 may be performed by agent guidance system 210 (e.g., by agent guidance application 215-1). In some implementations, some or all of the blocks of process 300 may be performed by one or more other devices. A description of FIG. 3 is provided below with reference to FIGS. 4 and 5, which provide examples of operations presented in process 300 of FIG. 3.

As shown in FIG. 3, process 300 may include receiving call scenario information (block 310). For example, agent guidance system 210 may receive call scenario information. Call scenario information may include one or more types of information relating to a hypothetical call. For instance, call scenario information may include caller input information (e.g., a word or phrase spoken by a caller, a selection of a button or interface object (e.g., a link) by the caller via caller device 240, etc.), caller description information (e.g., a name of the caller, a city, state, zip code, or country of the caller, a call history associated with the caller, a product or service purchased by the caller, etc.), call context information (e.g., a telephone number called by the caller, a call center department called by the caller, an agent called by the caller, etc.), agent input information (e.g., a word or phrase spoken by the agent, a selection of a button (e.g., a keyboard button, a mouse button, etc.) or an interface object (e.g., a link) by the agent, etc.), and/or one or more other types of information relating to a call. Agent guidance system 210 may receive call scenario information by providing a graphical interface to supervisor device 220, through which a call center supervisor or another type of individual may input information in a user-friendly manner. For instance, the graphical interface may include one or more interface objects (e.g., text boxes, drop down boxes, check boxes, etc.) for inputting call scenario information.

Process 300 may include defining a call scenario (block 320). For example, agent guidance system 210 may define a call scenario. In some implementations, agent guidance system 210 may define the call scenario based on call scenario information received from a supervisor (or another individual) using supervisor device 220. A call scenario may include a logical association between one or more types of call scenario information. For example, agent guidance system 210 may define a call scenario as a caller requesting a particular product or service, a caller that is located in a particular geographical area, a caller that has already purchased a particular product or service, a caller that has just called a particular telephone number, a caller that has a particular call history (e.g., has called a technical support call center on multiple prior occasions), etc.

Figure 4:
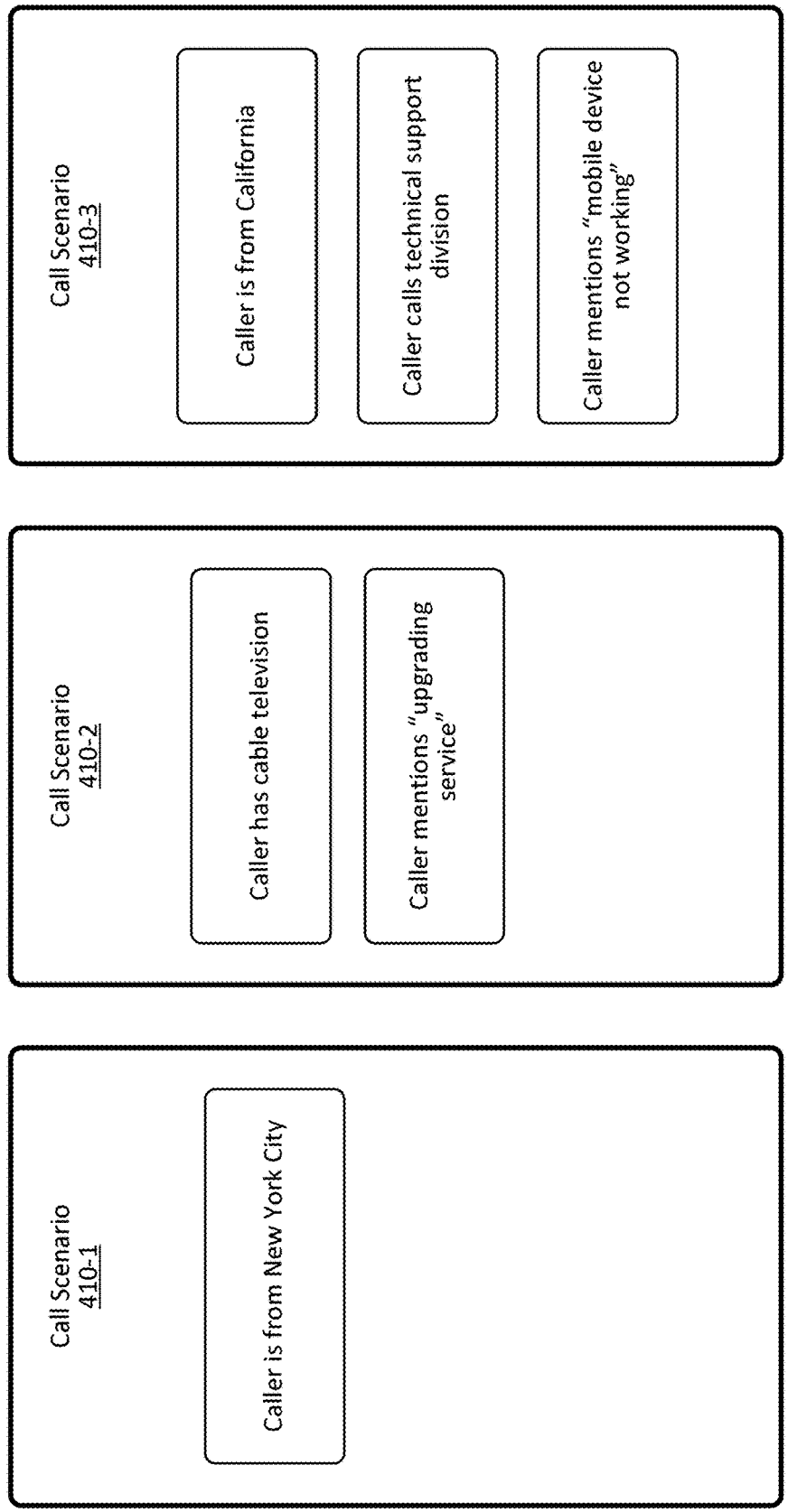
FIG. 4 illustrates example data structures for defining call scenarios.

FIG. 4 illustrates example data structures for defining call scenarios. As shown, a call scenario may be defined by associating one or more types of call scenario information to a call scenario. For example, call scenario 410-1 may be defined by the condition that the caller is from a particular geographical area (e.g., New York City). Call scenario 410-2 may be defined by the caller having a subscription to cable television and the caller saying the phrase "upgrading service" (or something analogous thereto). Call scenario 410-3 may be defined by the caller being from a particular geographical area (e.g., California), the caller contacting the technical support division of a call center, and the caller stating that his or her "mobile device is not working" (or something analogous thereto). As such, a call scenario may be defined by assigning one or more types of call scenario information to a call scenario.

Referring again to FIG. 3, process 300 may include receiving guidance template information (block 330). For example, agent guidance system 210 may receive guidance template information. In some implementations, agent guidance system 210 may receive guidance template information from a supervisor (or another individual) using supervisor device 220. Guidance template information may include one or more rules or instructions for creating a guidance prompt. For instance, guidance template information may include a rule for a generating graphical interface object (e.g., a window), a rule for populating the graphical interface object with information corresponding to a call, a rule for requiring an agent to complete a particular task described by the guidance template, and/or one or more other types of rules for creating a guidance prompt.

Additionally, or alternatively, guidance template information may include information to be presented to an agent in a guidance prompt, such as a title of a guidance prompt, a description of a product or service presented in a guidance prompt, a description of a task in a guidance prompt that an agent is required to perform, etc. Agent guidance system 210 may receive guidance template information by providing a graphical interface to supervisor device 220, through which a supervisor or another type of individual may input information in a user-friendly manner. For instance, the graphical interface may include one or more interface objects (e.g., text boxes, drop down boxes, check boxes, etc.) for inputting call scenario information. In some implementations, a single graphical interface may be presented for receiving call scenario information (block 310) and receiving guidance template information (block 330).

Process 300 may include creating a guidance template for a call scenario (block 340). For example, agent guidance system 210 may create a guidance template for a call scenario. Agent guidance system 210 may create the guidance template based on one or more types of guidance template information received from supervisor device 220 and/or by logically associating the guidance template information with one or more call scenarios. For instance, agent guidance system 210 may create a guidance template by associating a rule, such as a rule to display a requirement to an agent to discuss a particular product, with a call scenario defined by a caller saying a particular word or phrase, such as "I would like to upgrade my service." Such a guidance template may be used, for example, to generate a guidance prompt to discuss a particular product in response to a caller saying that he or she would like to upgrade his or her service. Accordingly, agent device 210 may generate a guidance template that is highly customized for a particular type of call.

Figure 5:
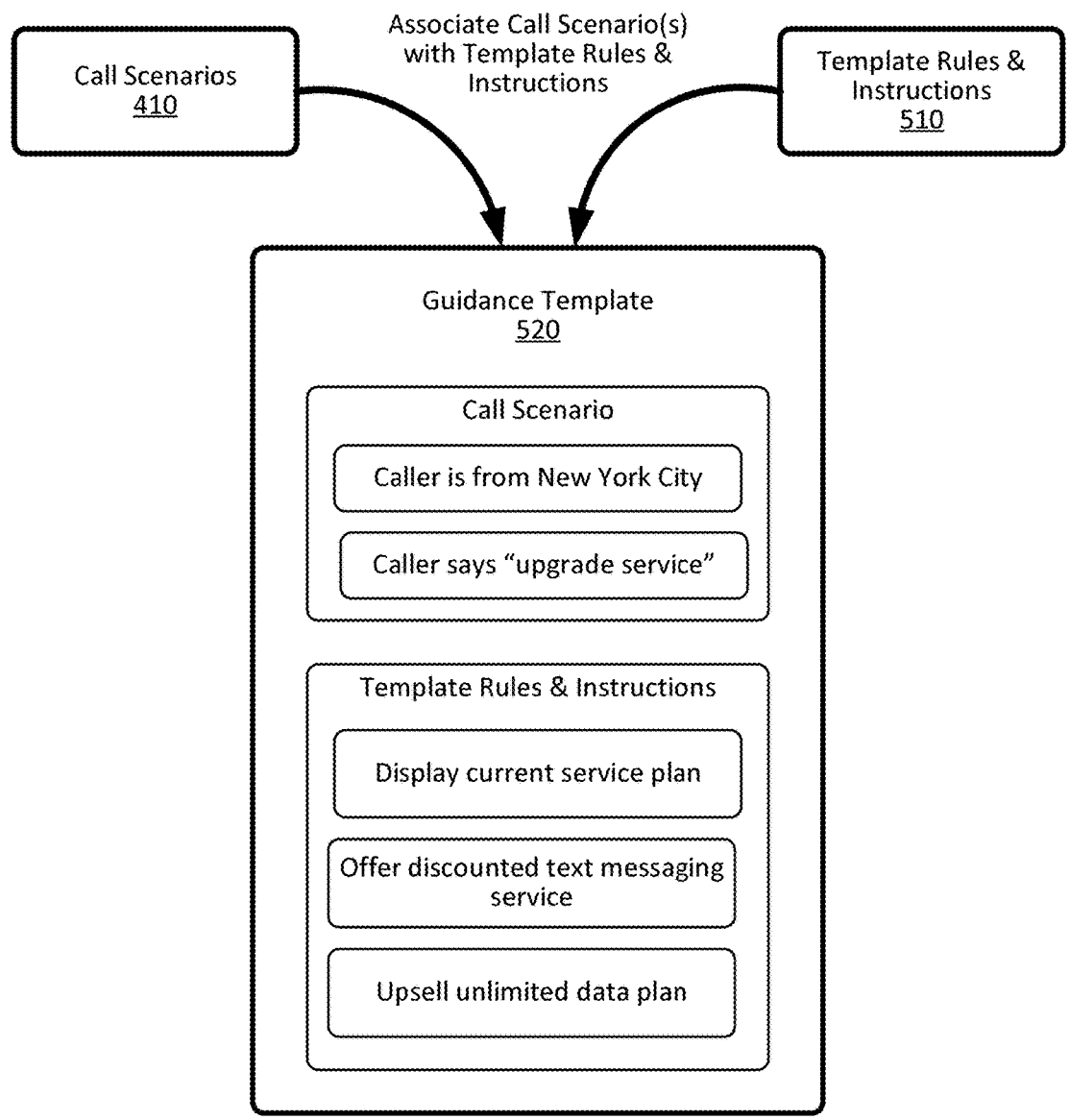
FIG. 5 illustrates an example implementation for creating a guidance template for a call scenario.

FIG. 5 illustrates an example implementation for creating a guidance template for a call scenario. As shown, one or more call scenarios 410 may be logically associated with one or more template rules & instructions 510 to create guidance template 520. In the depicted example, guidance template 520 may include a call scenario of the caller being from New York City and saying the phrase "upgrade service" at some point during a conversation with an agent. Additionally, or alternatively, guidance template 520 may include template rules and instructions to display a current service plan of the caller, offer the caller a discounted text messaging service, and sell (e.g., "up sell") an unlimited data plan to the caller. It should be noted, however, that guidance template 520 provides only one of many possible example guidance templates, as described herein.

Referring again to FIG. 3, process 300 may include storing a guidance template (block 350). For example, agent guidance system 210 may store a guidance template. In some implementations, agent guidance system 210 may store the guidance template in a storage device that is local to agent guidance system 210. Additionally, or alternatively, agent guidance system 210 may store the guidance template in a centralized storage device capable of being accessed by multiple agent guidance systems 210 corresponding to one or more different call centers. In some implementations, agent guidance system 210 may also, or alternatively, store the guidance template on agent device 230.

While FIG. 3 shows a flowchart diagram of an example process 300 for creating a guidance template, in other implementations, a process for creating a guidance template may include fewer operations, different operations, differently arranged operations, and/or additional operations than depicted in FIG. 3. In addition, while FIGS. 4 and 5 show example implementations with various features and information, in other implementations, example implementations may include fewer features and information, different features and information, differently arranged features and information, and/or additional features and information than the features and information depicted in FIGS. 4 and 5.

Figure 6:
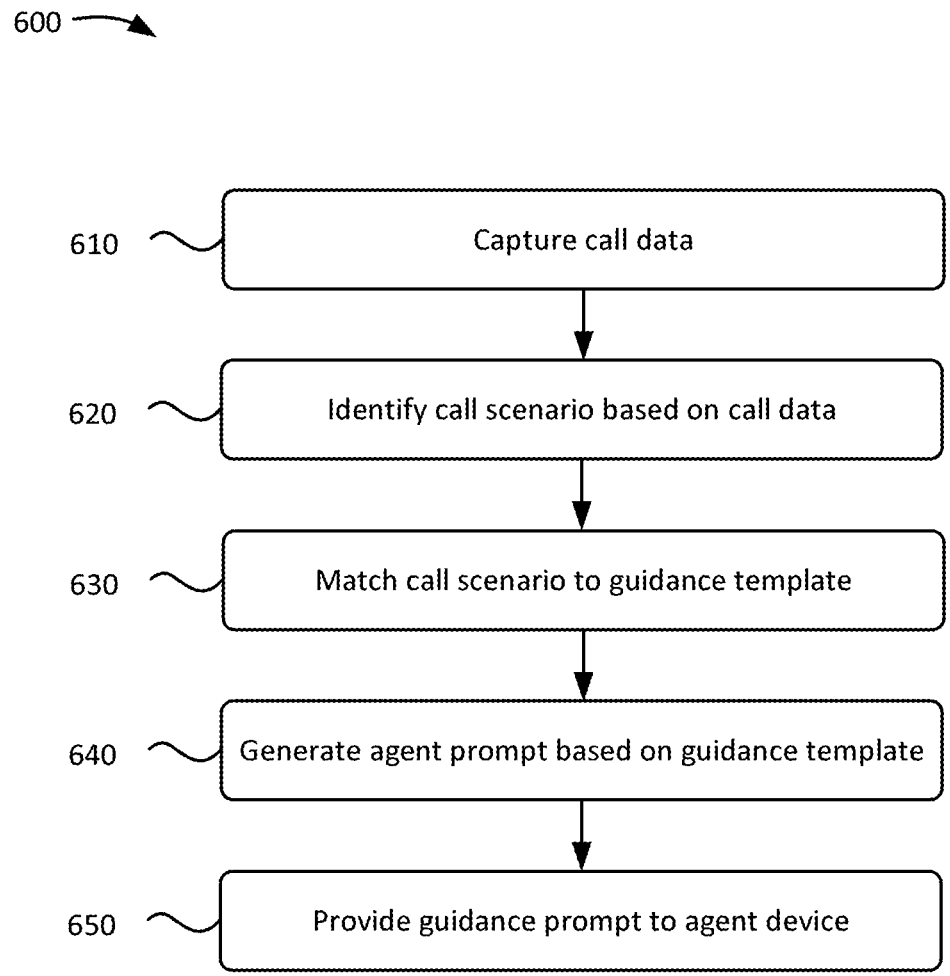
FIG. 6 illustrates a flowchart of an example process for providing a guidance prompt to an agent device.

FIG. 6 illustrates a flowchart of an example process 600 for providing a guidance prompt to agent device 230. In some implementations, process 600 may be performed by agent guidance system 210 (e.g., by agent guidance application 215-1). In some implementations, some or all of the blocks of process 600 may be performed by one or more other devices. A description of FIG. 6 is provided below with reference to FIGS. 7-10, which provide examples of operations presented in process 600 of FIG. 6.

As shown in FIG. 6, process 600 may include capturing call data (block 610). For example, agent guidance system 210 may capture call data. Call data may include one or more types of information relating to a call between agent device 230 and caller device 240. For example, call data may include an audio input corresponding to agent device 230 and/or caller device 240, and/or a word, a phrase, or another type of text derived from an audio input corresponding to agent device 230 and/or caller device 240. Additionally, or alternatively, call data may include a word, a phrase, or another type of text that is analogous to a word, a phrase, or another type of text corresponding to an audio input from agent device 230 and/or caller device 240. Call data may also, or alternatively, include a keyboard button, a mouse click, or another type of digital input corresponding to agent device 230 and/or caller device 240, a telephone number, an identifier, an account number, a product, a service, a call history, contents of a digital shopping cart, and/or one or more other types of information associated with an agent of agent device 230 and/or a caller of caller device 240, and/or one or more other types of information corresponding to a call between agent device 230 and caller device 240.

Figure 7:
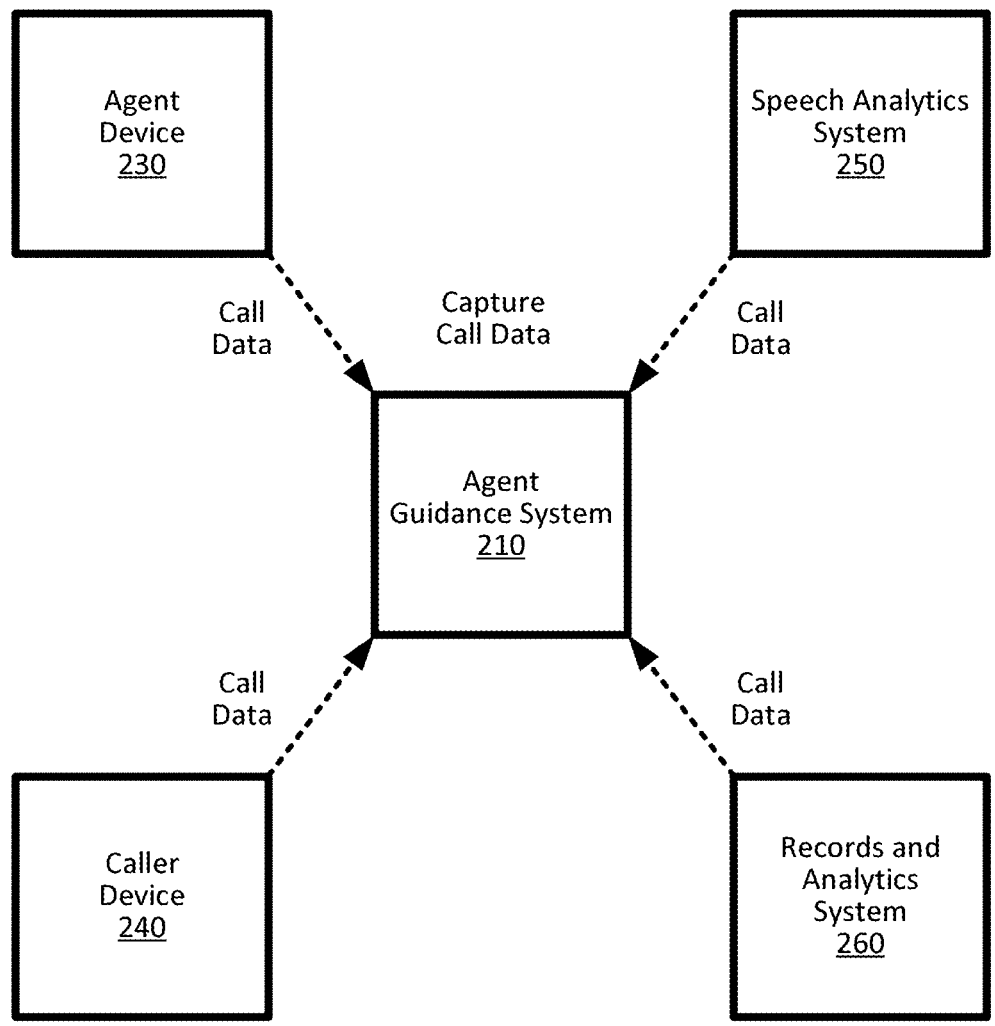
FIG. 7 illustrates an example implementation for capturing call data.

FIG. 7 illustrates an example implementation for capturing call data. As shown, agent guidance system 210 may capture call data by communicating with one or more devices (230-260). In some implementations, agent guidance device 210 may capture call data by communicating with agent device 230 and/or caller device 240. For example, agent guidance system 210 may capture call data by receiving an audio stream associated with agent device 230 and/or user device 240 and/or converting the audio stream to text. Additionally, or alternatively, agent device 230 may include an application programming interface (API) (e.g., an API of Hyper Text Markup Language version 5 (HTML5)) capable of capturing an audio stream associated with an agent of agent device 230 and/or a caller of caller device 240, converting the audio stream to text, and/or providing the converted text to agent guidance device 210. Agent guidance system 210 may, also, or alternatively, capture one or more other types of information by communicating with agent device 230 and/or caller device 240, such as text input by an agent of agent device 230 and/or a caller of caller device 240, an agent of agent device 230 and/or a caller of caller device 240 selecting a link or another type of graphical interface object, etc.

In some implementations, agent guidance system 210 may capture call data by communicating with speech analytics system 250. For example, an audio stream corresponding to an agent of agent device 230 and/or a caller of caller device 240 may be forwarded by speech analytics system 250, and speech analytics system 250 may convert the speech to text and/or forward the converted text to agent guidance system 210. In some implementations, speech analytics system 250 may also, or alternatively, provide other types of call data to agent guidance system 210. For instance, speech analytics system 250 may receive a word, a phrase, or another type of call data, identify a word, a phrase, and/or another type of call data analogous to, or otherwise associated with, the word or phrase received, and/or provide agent guidance system 210 with the analogous word, phrase, or other type of call data. For example, if a caller of caller device 240 says the phrase "upgrade phone service," speech analytics system 250 may be capable of determining that the phrase "upgrade phone service" is analogous to one or more other phrases, such as "upgrade telephone service," "upgrade cellular phone service," "upgrade mobile device service," etc.

Additionally, or alternatively, agent guidance system 210 may capture call data by communicating with records and analytics system 260. For example, agent guidance system 210 may provide records and analytics system 260 with one or more types of call data (e.g., a telephone number of caller device 240, an identifier of caller device 240, a name of a caller, an account number of a caller, a word, phrase, or other type of audio input from agent device 230 and/or caller device 240, etc.), and records an analytics system 260 may provide agent guidance system 210 with one or more types of information associated with the information received from agent guidance system 210. For instance, agent guidance system 210 may provide records and analytics system 260 with a telephone number of caller device 240, and records and analytics system 260 may respond by providing agent guidance system 210 with a name of a caller, an account number, one or more products or services purchased by the caller, and/or one or more other types of call data associated with the telephone number.

Returning now to FIG. 6, process 600 may include identifying a call scenario based on call data (block 620). For example, agent guidance system 210 may identify a call scenario based on call data. In some implementations, agent guidance system 210 may identify the call scenario by comparing one or more types of call data associated with a particular call with one or more previously defined call scenarios. (See, e.g., blocks 310 and 320 of FIG. 3 and FIG. 4). For example, if call data associated with a call between agent device 230 and caller device 240 includes the caller being from New York City and the caller saying the phrase "pay account balance" (or something analogous thereto), agent guidance system 210 may identify a corresponding call scenario.

Figure 8:
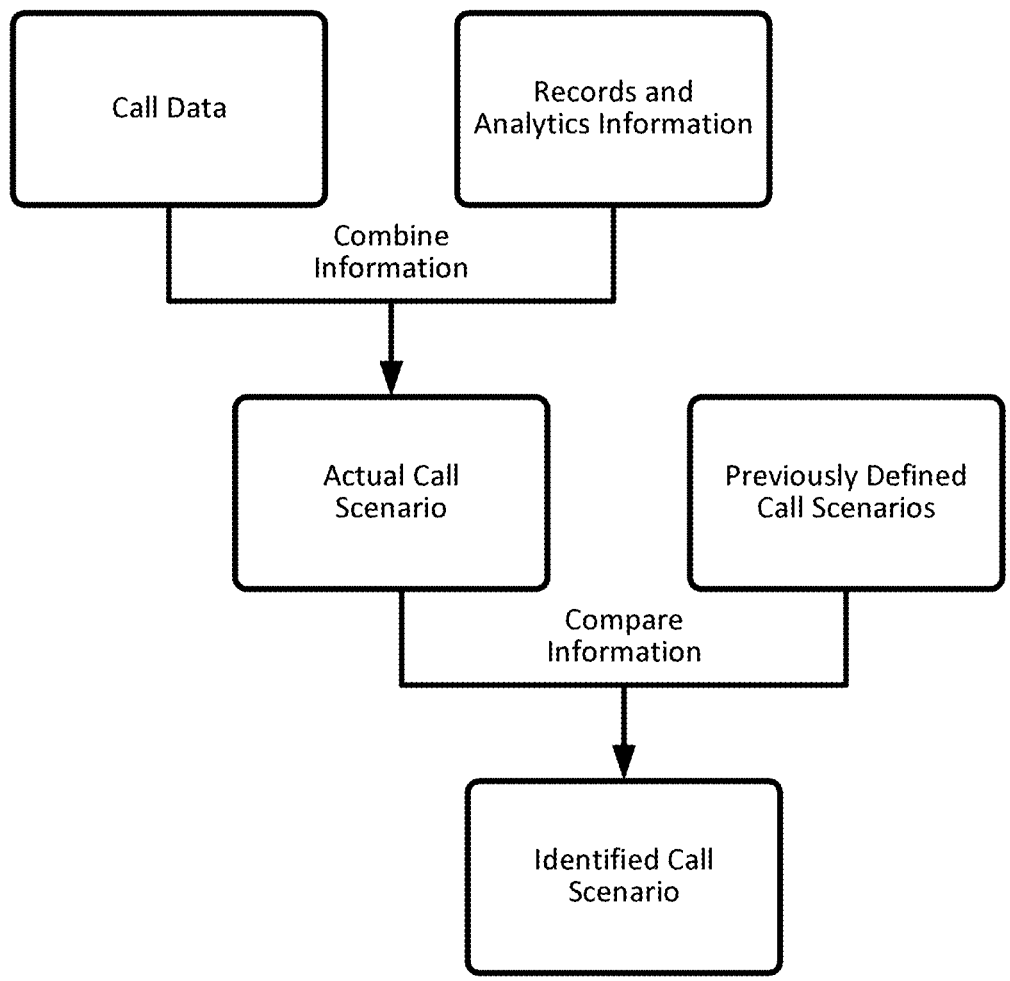
FIG. 8 illustrates an example implementation for identifying a call scenario based on call data.

FIG. 8 illustrates an example implementation for identifying a call scenario based on call data. As shown, agent guidance system 210 may combine call data associated with an actual call records and analytics information (e.g., data from records and analytics system 260) to define an actual call scenario that is occurring between agent device 230 and caller device 240. For instance, agent guidance system 210 may receive a telephone number corresponding to caller device 240, communicate the telephone number to records and analytics system 260 in order to retrieve a geographical location and telecommunications service plan associated with the telephone number, and determine that the actual call scenario occurring between agent device 230 and caller device 240 is a call scenario defined by a telephone number of caller device 240 and a geographic location and a service plan associated with the telephone number.

Additionally, or alternatively, agent guidance system 210 may compare the actual call scenario with previously defined call scenarios to identify which of the previously defined scenarios matches the call between agent device 230 and caller device 240. For example, if the actual call scenario includes a geographical location and a service plan associated with the telephone number of caller device 240, agent guidance system 210 may identify which call scenario of the previously defined call scenarios includes call scenario information that matches the geographical location and service plan of caller device 240. In some implementations, agent guidance system 210 may identify multiple call scenarios based on a single set of call data and/or records and analytics information, such as when the actual call scenario corresponds to more than one of the previously defined call scenarios. As such, agent guidance system 210 may perform one or more operations to identify a call scenario based on call data.

Returning to FIG. 6, process 600 may include matching a call scenario to a guide template (block 630). For example, agent guidance device 210 may match a call scenario to a guide template. In some implementations, agent guidance device 210 may match the call scenario to the guidance template by comparing one or more types of information associated with the call scenario to one or more types of information associated with previously prepared guidance templates. (See, e.g., block 340 of FIG. 3 and FIG. 5).

In some implementation, a single call scenario may be a matched with multiple guidance templates. In such implementations, agent guidance device 210 may implement one or more operations for determining which of the matching guidance templates is the preferred match for the call scenario. For instance, agent guidance device 210 may identify the best match for a particular call scenario based on a dates that guidance templates were created (e.g., the most recent date), an importance ranking associated with the guidance template (e.g., when the guidance template was created), a user (e.g., a supervisor) that created the guidance template, a topic or category associated with the guidance template (e.g., sales, quality control, etc.), and/or one or more other reasons.

Figure 9:
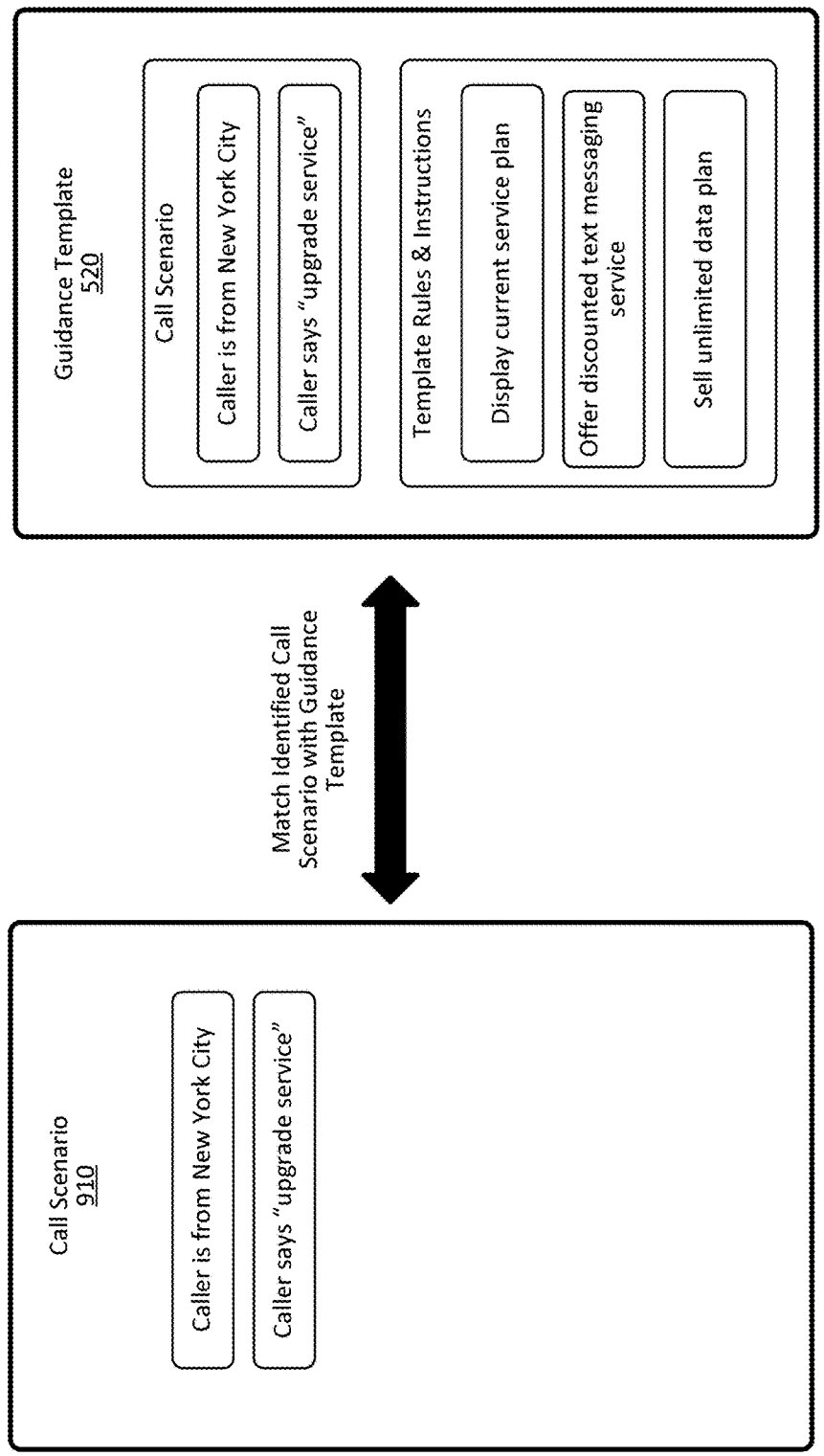
FIG. 9 illustrates an example implementation for matching a call scenario with a guidance template.

FIG. 9 illustrates an example implementation for matching a call scenario with a guidance template. As shown, agent guidance device 210 may match call scenario 910 with guidance template 520 by comparing one or more types of information associated with call scenario 910 to one or more types of information associated with guidance template 520. In the depicted example, call scenario 910 includes the call scenario information of a caller being from New York City and the caller saying the phrase "upgrade service." Similarly, guidance template includes call scenario information of the caller being from New York City and the caller saying the phrase "upgrade service." As such, call scenario 910 matches guidance template 520. In some implementations, agent guidance device 210 may match a call scenario with a guidance template based on one or more other types of information and/or additional types of information.

Referring again to FIG. 6, process 600 may include generating a guidance prompt based on a guidance template (block 640). For example, agent guidance system 210 may generate a guidance prompt based on a guidance template.

In some implementations, agent guidance template 210 may generate the guidance prompt based on the guidance template by executing one or more rules and instructions associated with the guidance template. (See, e.g., block 340 of FIG. 3 and FIG. 5). Additionally, or alternatively, agent guidance template 210 may generate the guidance prompt based on the guidance template by executing one or more default rules and/or instructions for generating a guidance prompt. Examples of a default rule and/or instruction for generating a guidance prompt may include an instruction for creating a graphical interface object (e.g., a window) for displaying call information, tasks, and/or one or more other types of guidance prompt content to an agent of agent device 230, including an indicator of whether each task included in the guidance template has been completed, displaying a link for contacting a supervisor of the agent, etc.

Figure 10:
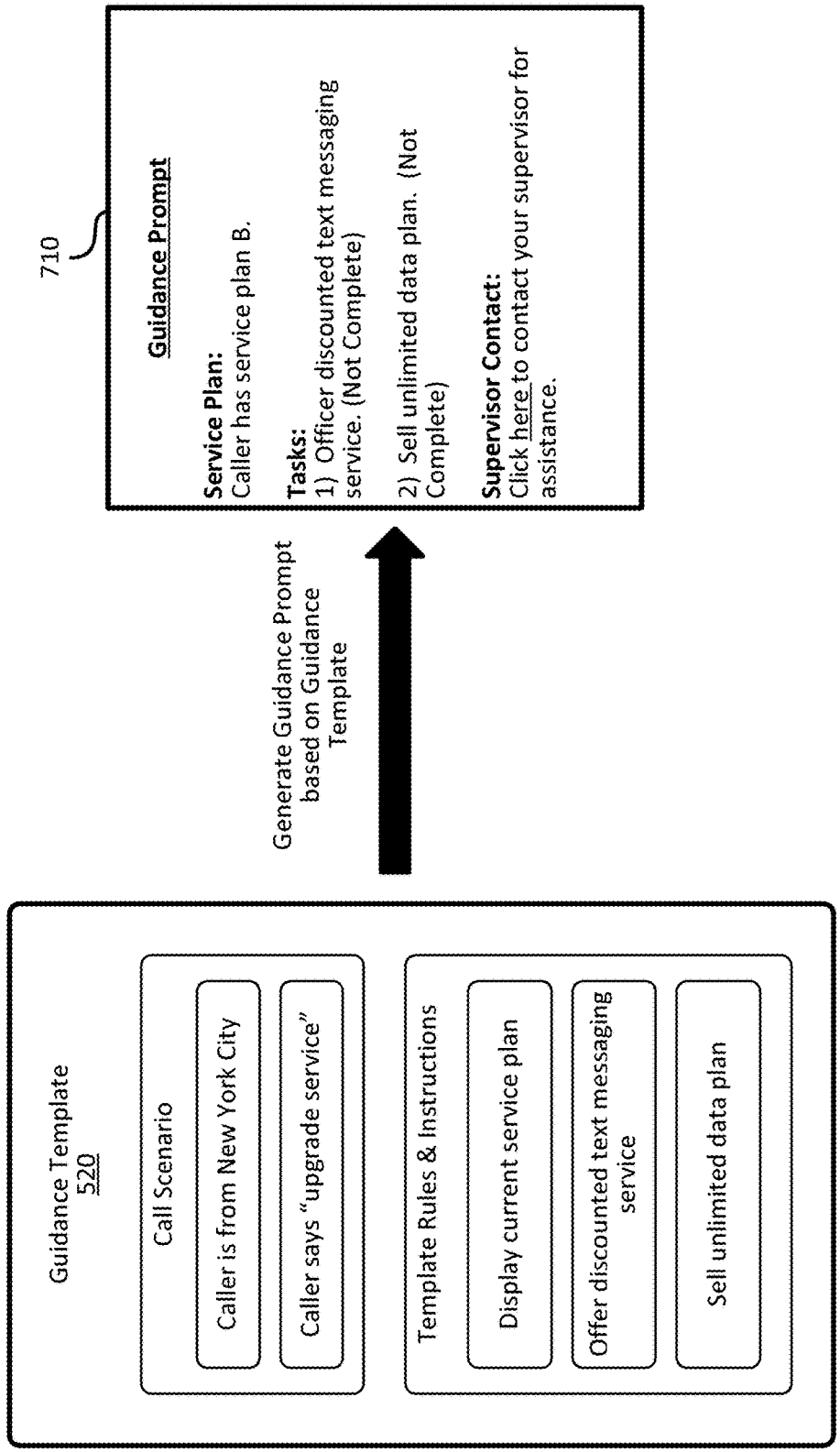
FIG. 10 illustrates an example implementation for generating a guidance prompt based on a guidance template.

FIG. 10 illustrates an example implementation for generating a guidance prompt based on a guidance template. As shown, agent guidance device 210 may generate guidance prompt 710 based on guidance template 520. In the depicted example, guidance template 520 includes template rules and instructions for displaying a current service plan of a caller, a task to offer discounted text messaging services to the caller, and another task to sell an unlimited data plan for a mobile device. As such, agent guidance system 210 may generate guidance prompt 710 that includes a window for displaying guidance prompt content, displaying a service plan of the caller, displaying a task to offer a discounted text messaging service to the caller, and a task to sell an unlimited data plan to the caller. As depicted, agent guidance system 210 may also, or alternatively, include an indicator (e.g., "Completed" or "Not Completed") for each task and a link for contacting a supervisor of an agent talking the call to which the guidance prompt corresponds.

Returning again to FIG. 3, process 600 may include providing a guidance prompt to agent device 230 (block 650). For example, agent guidance device 210 may provide a guidance prompt to agent device 230. In some implementations, agent guidance device 210 may provide the guidance prompt to agent device 230 so that agent device 230 may display the guidance prompt to an agent of agent device 230.

While FIG. 6 shows a flowchart diagram of an example process 600 for providing a guidance prompt to agent device 230, in other implementations, a process for providing a guidance prompt to agent device 230 may include fewer operations, different operations, differently arranged operations, and/or additional operations than depicted in FIG. 6. For example, agent guidance device 210 may provide a guidance prompt to agent device 230 by cooperating with agent device 230 to receive a keyword extracted from an audio stream corresponding to a telephone call between a call center agent and a caller, match the keyword to a plurality of guidance templates to obtain a guidance template relevant to the audio stream, and provide a graphical prompt, pursuant to instructions of the matched guidance template, to the call center agent during the telephone call. In another example, in some implementations, agent guidance device 210 may provide a guidance template to agent device 230 instead of, for example, generating a guidance prompt based on the guidance template and providing the guidance prompt to agent device 230. Additionally, or alternatively, agent guidance device 210 may perform one or more operations to monitor agent device 230 after providing the guidance prompt to agent device 230 and/or determine whether the tasks associated with the guidance template and/or guidance prompt are completed. In addition, while FIGS. 7-10 show example implementations with various features and information, in other implementations, example implementations may include fewer features and information, different features and information, differently arranged features and information, and/or additional features and information than the features and information depicted in FIGS. 7-10.

Figure 11:
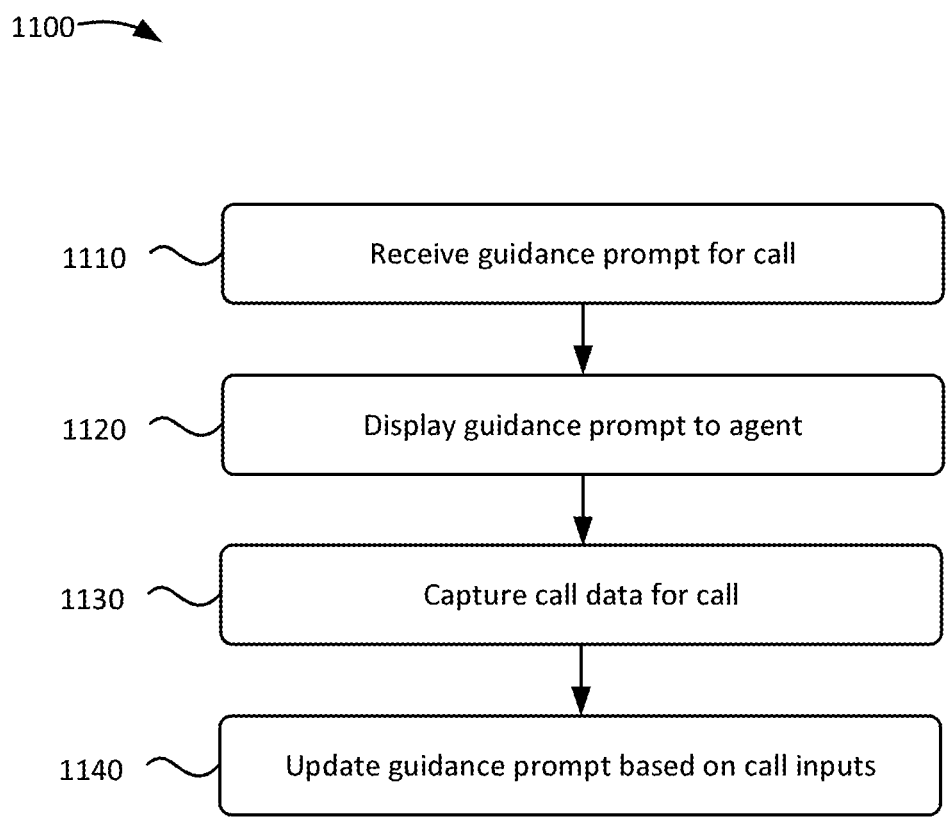
FIG. 11 illustrates an example process for proving a guidance prompt to an agent.

FIG. 11 illustrates an example process 1100 for proving a guidance prompt to an agent. In some implementations, process 1100 may be performed by agent device 230 (e.g., by agent guidance application 215-2). In some implementations, some or all of the blocks of process 1100 may be performed by one or more other devices.

As depicted, process 1100 may include receiving a guidance prompt for a call (block 1110). For example, agent device 230 may receive a guidance prompt for a call. In some implementations, agent device 230 may receive the guidance prompt from agent guidance system 210. In some implementations, the guidance prompt received may include a finalized data structure that includes one or more displayable features and/or one or more types of content information, such as a window for displaying information about an agent, information about a caller, information about one or more tasks to be completed by the agent, one or more indicators for indicating whether a task has been completed, a link for contacting a supervisor of the agent, and/or one or more other types of features or information to assist an agent with a call. In other implementations, the guidance prompt received from agent guidance system 210 may be in the form of one or more rules and/or types of information (e.g., a guidance template) for generating the guidance prompt, which may be executed by agent device 230.

Process 1100 may also include displaying a guidance prompt to an agent (block 1120). For example, agent device 230 may display a guidance prompt to an agent. In some implementations, agent device 230 may display the guidance prompt to the agent by overlaying the guidance prompt on a graphical interface displayed to the user. For example, a display of agent device 230 may include a graphical interface corresponding to an account of a caller or another type of graphical interface, and agent device 230 may display the guidance prompt to the agent by superimposing the guidance prompt on top of the account of the caller. In some implementations, the guidance prompt may be superimposed at a particular location of the graphical interface already displayed to the agent to, for example, ensure that the guidance prompt does not cover information that the agent may need in his or her conversation with the caller. Additionally, the guidance prompt may be movable, removable, resizable, or otherwise controlled by the agent within the graphical interface.

Process 1100 may include capturing call data for a call (block 1130). For example, agent device 230 may capture call data for a call. In some implementations, the call data captured by agent device 230 may include an audio input corresponding to agent device 230 and/or caller device 240, a word, a phrase, or another type of text derived from an audio input corresponding to agent device 230 and/or caller device 240, a word, a phrase, or another type of text that is analogous to a word, a phrase, or another type of text derived corresponding to an audio input from agent device 230 and/or caller device 240, a keyboard button, a mouse click, or another type of digital input corresponding to agent device 230 and/or caller device 240, a telephone number, an identifier, an account number, a product, a service, a call history, and/or one or more other types of information associated with an agent of agent device 230 and/or a caller of caller device 240, and/or one or more other types of information corresponding to a call between agent device 230 and caller device 240. In some implementations, agent device 230 may capture the call data by communicating with one or more devices, such as agent guidance system 210, supervisor device 220, another agent device 230, caller device 240, speech analytics system 250, records and analytics system 260, etc.

Process 1100 may include updating a guidance prompt based on call data (block 1140). For example, agent device 230 may update a guidance prompt based on call data. In some implementations, agent device 230 may update the guidance prompt by adding, removing, and/or changing one or more features and/or types of information of the guidance prompt. For example, agent device 230 may present a guidance prompt that includes a task for the agent to talk about a particular service, capture call data indicating that the agent has talked about the service, and update the guidance prompt to indicate that the task has been completed. In some implementations, agent device 230 may update a guidance prompt by providing an additional guidance prompt. For instance, agent device 230 may provide a guidance prompt with a particular task, and upon determining that a task has been completed, update the guidance prompt by generating a new guidance prompt indicting that the task has been completed, by generating a new guidance prompt that no longer includes the task, etc.

As such, FIG. 11 illustrates an example process 1100 for proving a guidance prompt to an agent that includes several operations (1110-1140). However, while FIG. 11 shows a flowchart diagram of an example process 1100 for proving a guidance prompt to an agent, in other implementations, a process for proving a guidance prompt to an agent may include fewer operations, different operations, differently arranged operations, and/or additional operations than depicted in FIG. 11.

Figure 12:
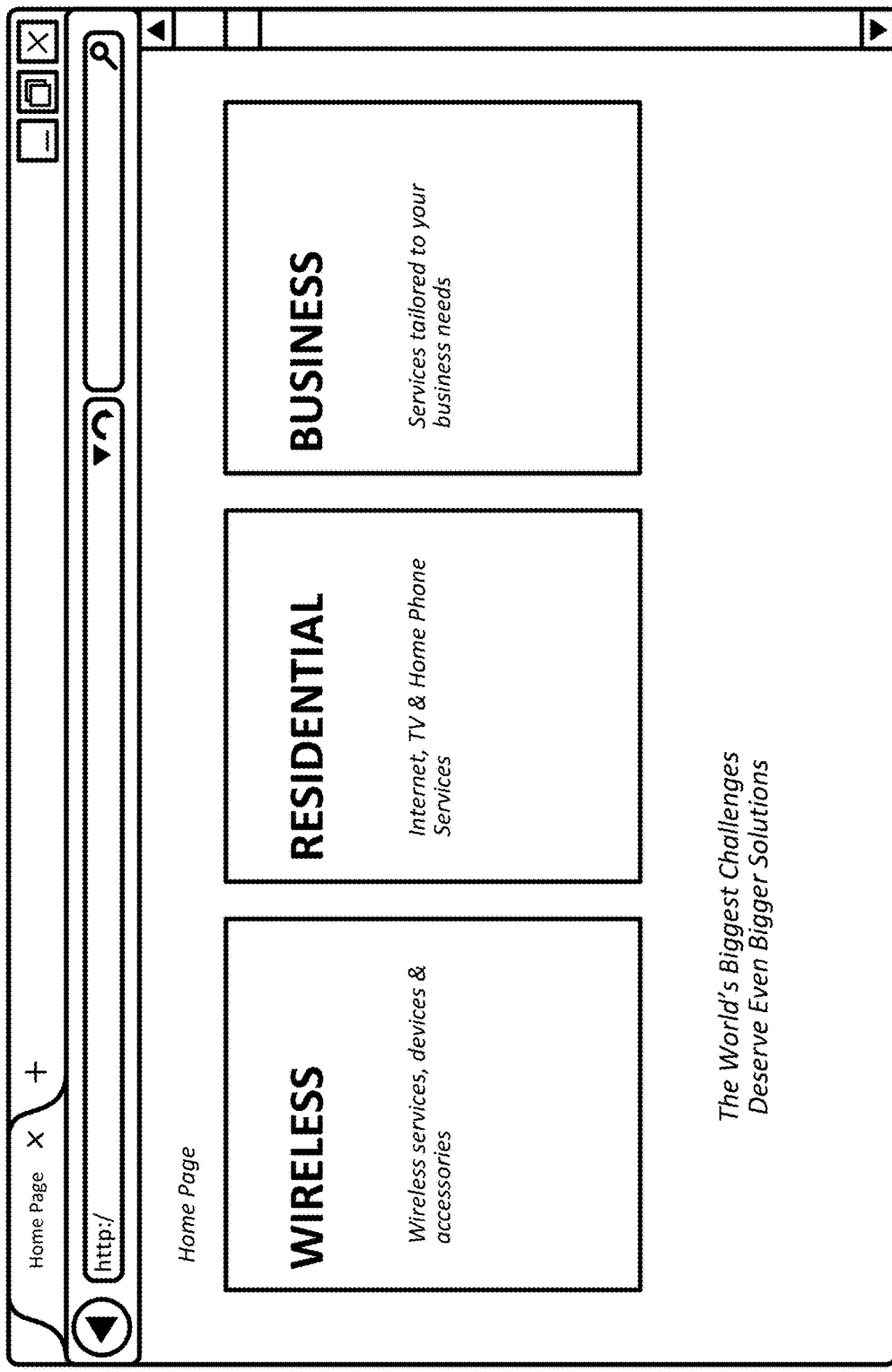
FIGS. 12-17 illustrate example graphical interfaces corresponding to an agent device during a call.

FIGS. 12-17 illustrate example graphical interfaces corresponding to an agent device during a call. As depicted in FIG. 12, agent device 230 may display a graphical interface to an agent during a call. The graphical interface may include a webpage displayed by a browser application. In the depicted example of FIG. 12, the graphical interface includes a home page with links and information about wireless services, residential services, and business services, which may be displayed by agent device 230 at the beginning of a call. The graphical interface may be part of an LOB application for an organization that the agent works for or with.

Figure 13:
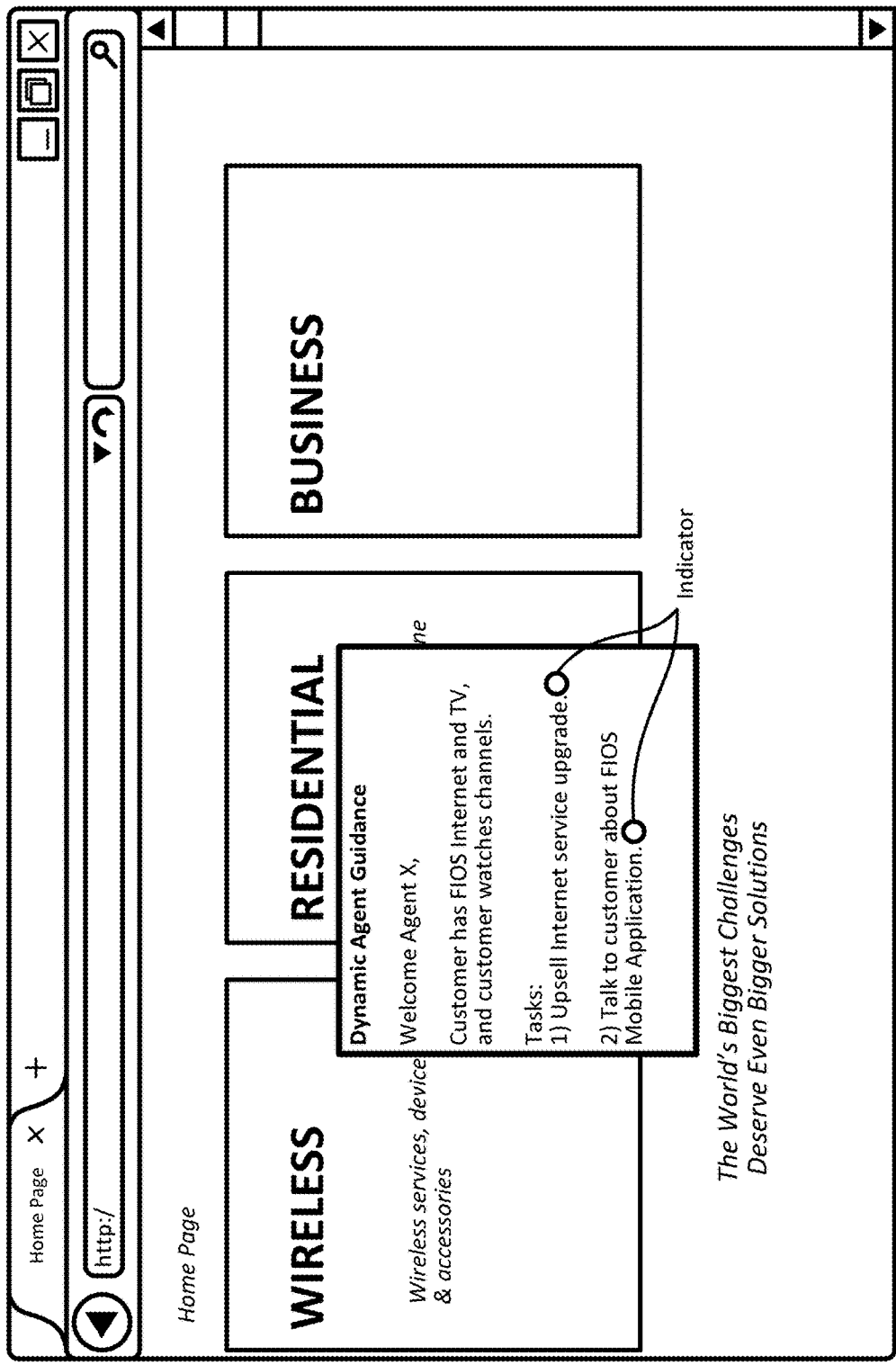
Figure 14:
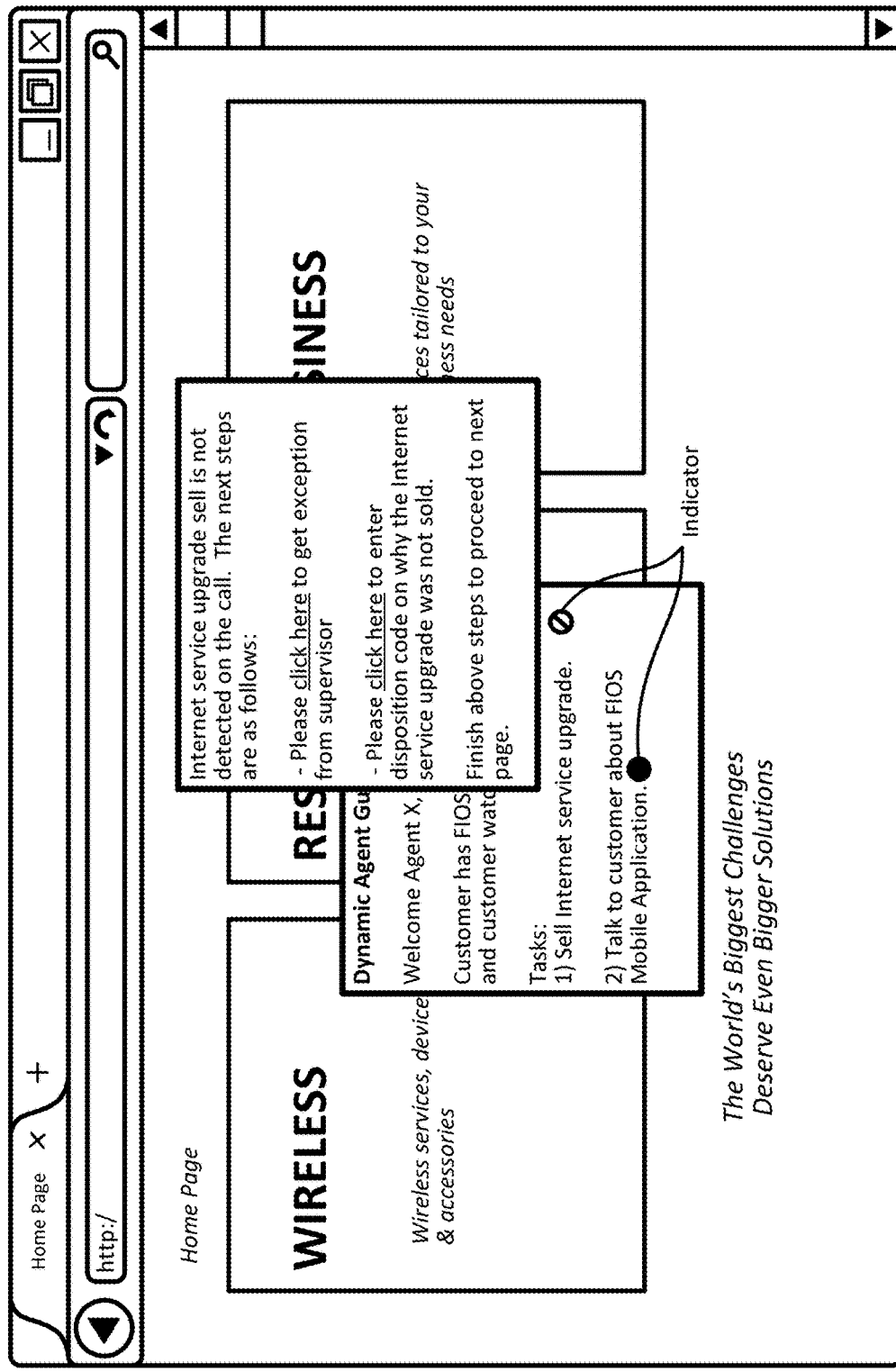

At some point during the call, agent device 230 may display a guidance prompt to the agent, as depicted in FIG. 13. Agent device 230 may display the guidance prompt to the agent in response to things said by the caller, things said by the agent, and/or one other types of call data collected during the call. The guidance prompt may include a message to the agent, such as "Welcome Agent X," and/or information about the caller, such as the caller having a particular Internet and television service (e.g., Fiber Optic (FiOS)), and/or an indication of whether the caller uses the services. Additionally, or alternatively, the guidance prompt may include one or more tasks, such as a task to sell an Internet service upgrade and another task to talk to the customer about a mobile application (e.g., a FiOS mobile application), and/or one or more indictors to indicate whether the task has been completed. In the depicted example of FIG. 13, a circle indicates that the corresponding task has not been completed.

Agent device 230 may monitor the conversation between the agent and caller, determine whether a task has been completed based on the conversation, and upgrade the indicator corresponding to the task accordingly. For example, in FIG. 14, agent device 230 may determine that the task to sell the Internet service upgrade was not completed successfully but that the task of talking to the customer about the FiOS mobile application was completed, and/or may update the respective indicators accordingly. Additionally, or alternatively, agent device 230 may display an additional guidance prompt instructing the agent on how to proceed, such as by requesting an exception from a supervisor of the agent regarding the task to sell the Internet service upgrade and/or by entering a disposition code on why the Internet service upgrade was not sold. The guidance prompt may also indicate that completing the foregoing follow-up tasks will lead to another guidance prompt (not shown). At some point, agent device 230 may further update the graphical interface in accordance with actions taken by the agent, whether outstanding tasks are completed, whether additional guidance prompts are provided, etc.

Figure 15:
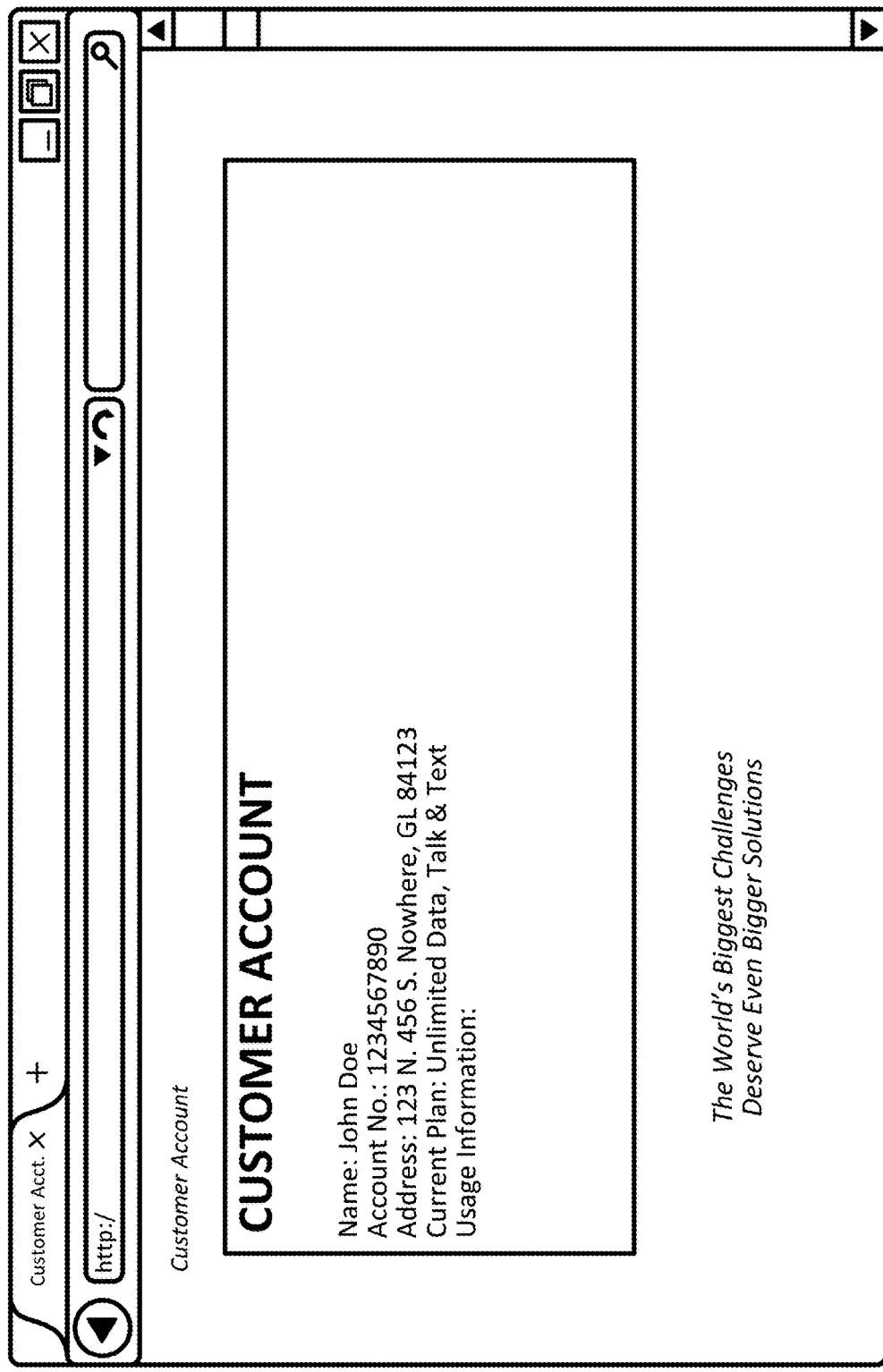
Figure 16:
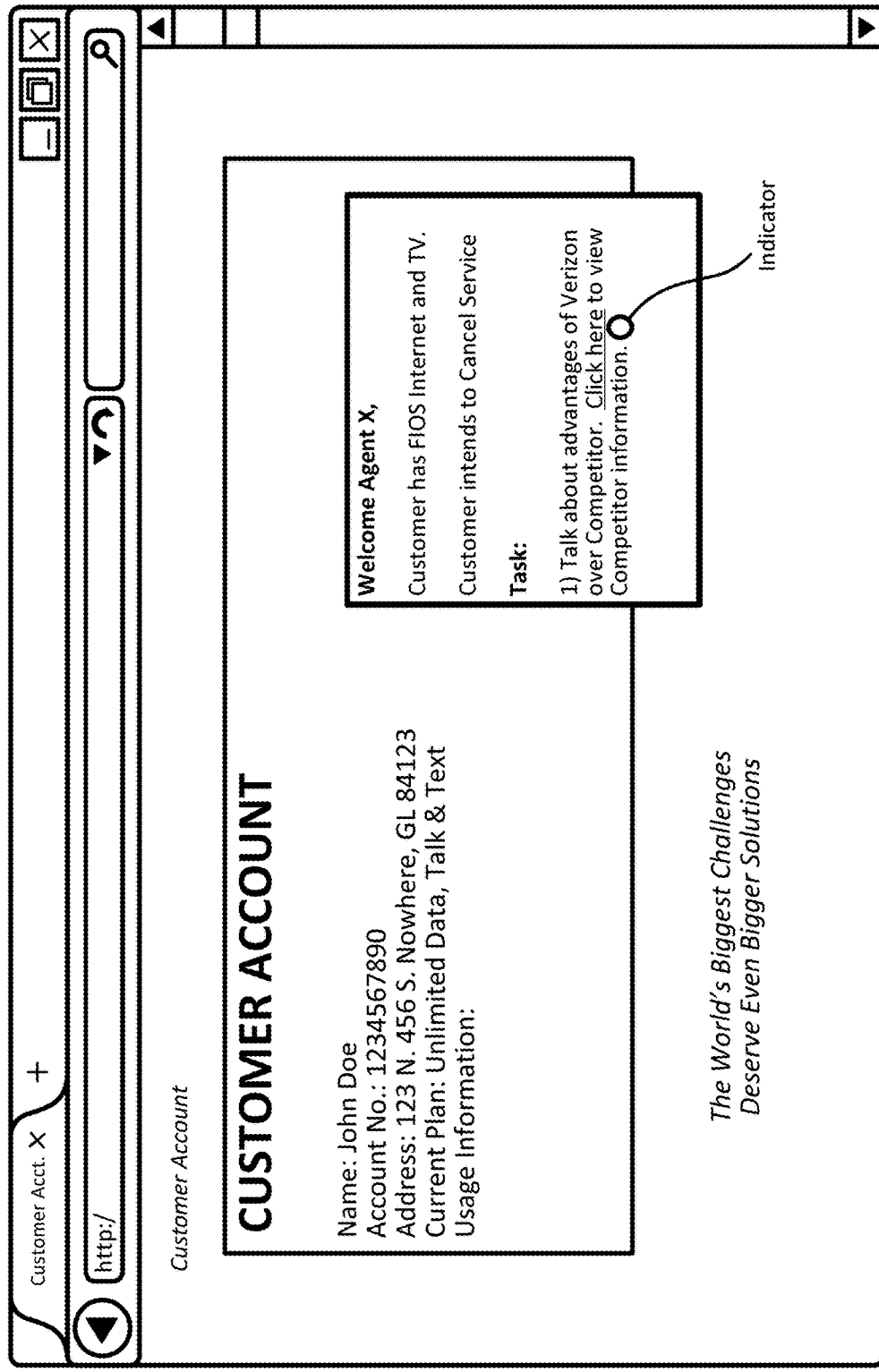
Figure 17:
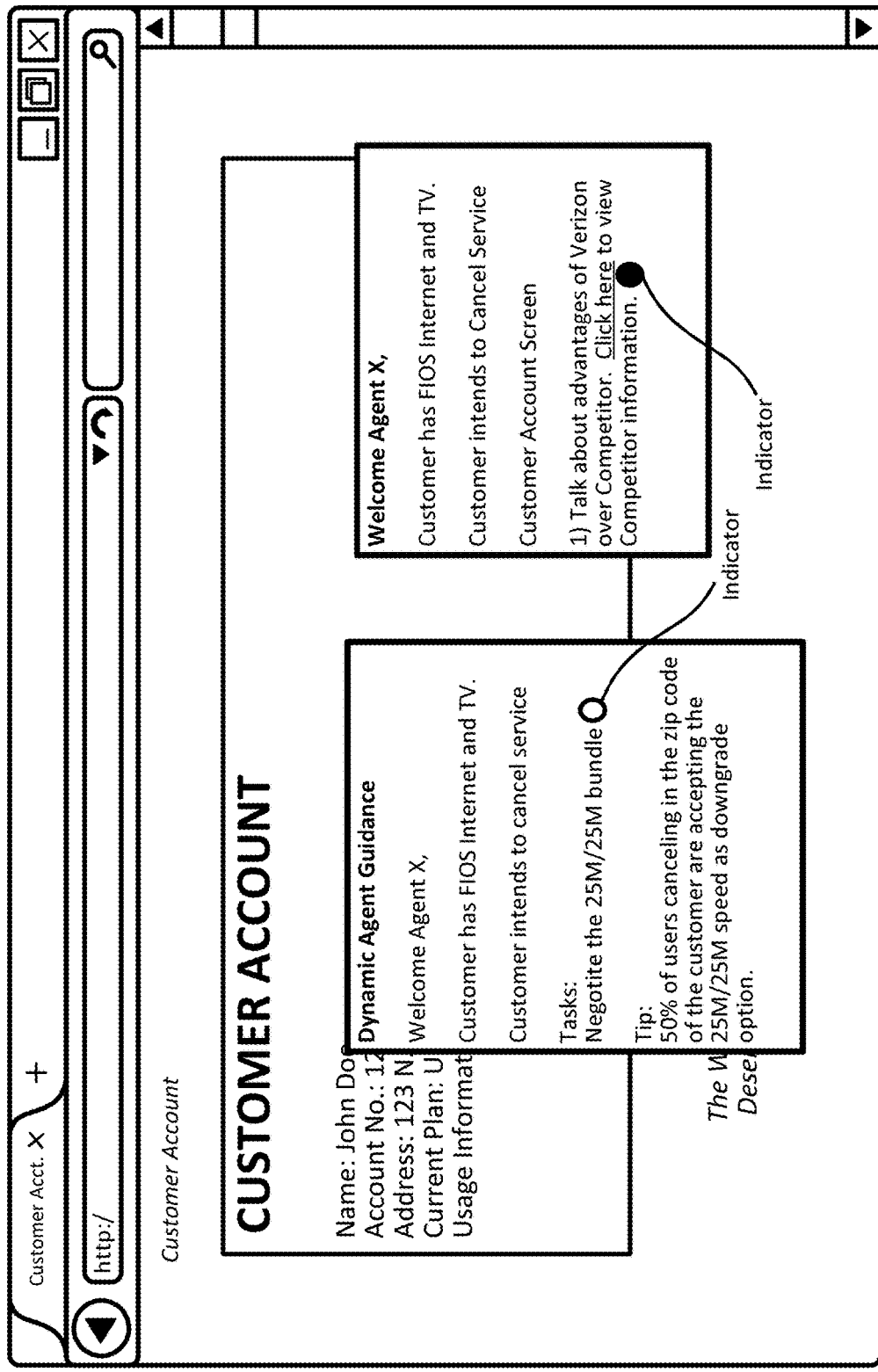

FIGS. 15-17 illustrate an example of another graphical interface of an agent device during a call. As depicted in FIG. 15, agent device 230 may display a graphical interface to an agent during a call. The graphical interface may include a webpage displayed by a browser application. In the depicted example of FIG. 15, the graphical interface includes a customer account page that may include information about a customer (e.g., the caller), which may be displayed by agent device 230 at the beginning of a call. The graphical interface may be part of an LOB application for an organization that the agent works for or with.

At some point during the call, agent device 230 may display a guidance prompt to the agent, as depicted in FIG. 16. Agent device 230 may display the guidance prompt to the agent in response to things said by the caller, things said by the agent, and/or one other types of call data collected during the call. The guidance prompt may include a message to the agent, such as "Welcome Agent X," and/or information about the caller, such as the caller having a particular Internet and television service (e.g., FiOS) and/or the purpose for the call, such as the caller intending to cancel his or her service. Additionally, or alternatively, the guidance prompt may include one or more tasks, such as a task to talk about advantages that the organization may have over competitors, a link to information regarding the competitors, and/or an indicator to indicate whether the task has been completed. In the depicted example of FIG. 16, a circle indicates that the corresponding task has not been completed.

Agent device 230 may determine whether a task has been completed based on the conversation and upgrade the indicator accordingly. For example, in FIG. 17, agent device 230 may determine that the task to talk about advantages that the organization may have over competitors was completed and/or may update the respective indicator by filling in the circle. Additionally, or alternatively, agent device 230 may display an additional guidance prompt instructing the agent on how to proceed, such as by negotiating a particular bundle of services, and/or providing information to assist in the completion of the task, such as providing success rate information regarding similar negotiations. At some point, agent device 230 may further update the graphical interface in accordance with actions taken by the agent, whether outstanding tasks are completed, whether additional guidance prompts are provided, etc.

Figure 18:
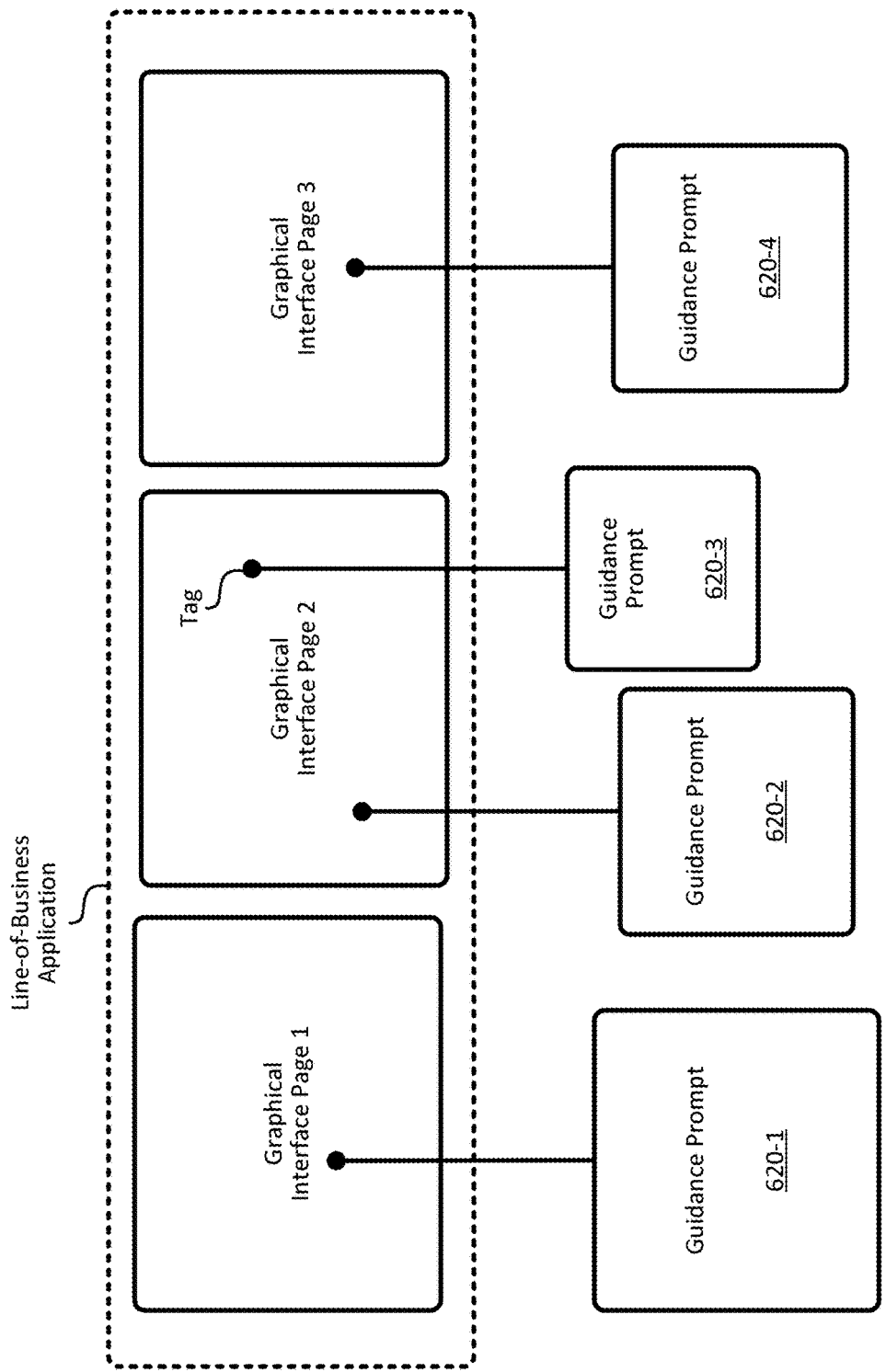
FIG. 18 illustrates an example implementation for integrating guidance prompts into a line-of-business (LOB) application.

FIG. 18 illustrates an example implementation for integrating guidance prompts into an LOB application. A LOB application may include a graphical interface with one or more pages (e.g., graphical interface page 1, graphical interface page 2 and so on). Examples of an LOB application may include a website run by an organization, an application for an account of the caller (e.g., a customer account), an application for ordering products or services, an application for providing technical support to the caller, an application for executing financial transactions, an application for logging complaints from the caller, etc. One or more tags (e.g., HTML tags) may be embedded at one or more location within the code of the LOB application. A tag may include information for prompting agent guidance system 210 and/or agent device 230 to generate a guidance prompt, information for prompting agent guidance system 210 and/or agent device 230 to update a guidance prompt, instructions and/or information regarding the location that the guidance prompt should appear when displayed to the agent, and/or one or more other types of information for assisting an agent during a call. For example, a tag may include instructions for generating a guidance prompt regarding a particular service in response to the agent clicking a link associated with the particular service.

Figure 19:
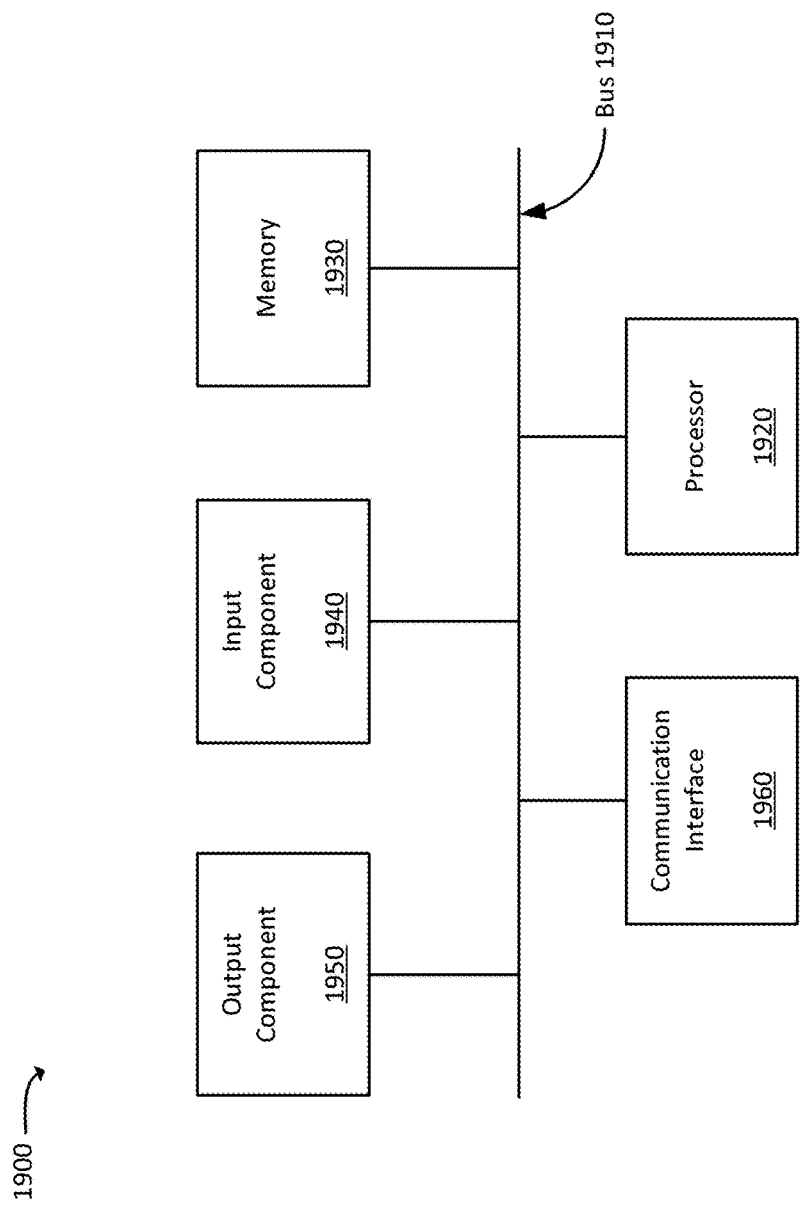
FIG. 19 illustrates example components of one or more devices, according to one or more implementations described herein.

FIG. 19 is a diagram of example components of device 1900. One or more of the devices described above (e.g., with respect to FIGS. 1A, 2, and 7) may include one or more devices 1900. Device 1900 may include bus 1910, processor 1920, memory 1930, input component 1940, output component 1950, and communication interface 1960. In another implementation, device 1900 may include additional, fewer, different, or differently arranged components.

Bus 1910 may include one or more communication paths that permit communication among the components of device 1900. Processor 1920 may include a processor, microprocessor, or processing logic that may interpret and execute instructions. Memory 1930 may include any type of dynamic storage device that may store information and instructions for execution by processor 1920, and/or any type of non-volatile storage device that may store information for use by processor 1920.

Input component 1940 may include a mechanism that permits an operator to input information to device 1900, such as a keyboard, a keypad, a button, a switch, etc. Output component 1950 may include a mechanism that outputs information to the operator, such as a display, a speaker, one or more light emitting diodes (LEDs), etc.

Communication interface 1960 may include any transceiver-like mechanism that enables device 1900 to communicate with other devices and/or systems. For example, communication interface 1960 may include an Ethernet interface, an optical interface, a coaxial interface, or the like. Communication interface 1960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1900 may include more than one communication interface 1960. For instance, device 1900 may include an optical interface and an Ethernet interface.

Device 1900 may perform certain operations relating to one or more processes described above. Device 1900 may perform these operations in response to processor 1920 executing software instructions stored in a computer-readable medium, such as memory 1930. A computer-readable medium may be defined as a non-transitory memory device.

A memory device may include space within a single physical memory device or spread across multiple physical memory devices. The software instructions may be read into memory 1930 from another computer-readable medium or from another device. The software instructions stored in memory 1930 may cause processor 1920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by one or more devices, a keyword extracted from an audio stream corresponding to a telephone call between an agent device of a call center agent and a caller device of a caller, the keyword being received during the telephone call;
    obtaining, by the one or more devices and based on an identifier of the caller device obtained during the telephone call, customer account information associated with the caller that predates the telephone call;
    selecting, by the one or more devices and based on the keyword and the customer account information, a particular guidance template, from a plurality of guidance templates that were created prior to the telephone call, that is relevant to the audio stream of the telephone call, the plurality of guidance templates each including instructions for guiding call center agents during audio calls;
    generating, by the one or more devices, a graphical prompt pursuant to the instructions of the selected particular guidance template, the instructions causing inclusion of at least some of the customer account information in the graphical prompt and the graphical prompt displaying information for assisting the call center agent with the telephone call; and
    providing, by the one or more devices, the graphical prompt to the call center agent during the telephone call, the graphical prompt including the at least some of the customer account information in accordance with the instructions of the selected particular guidance template;
    monitoring, by the one or more devices and after providing the graphical prompt to the call center agent, the telephone call based on keywords from the telephone call and instructions of the guidance template corresponding to the graphical prompt;
    presenting, by the one or more devices, during the telephone call, and based on the monitoring, a visual indicator in the graphical prompt, for each instruction of the guidance template, wherein a particular visual indicator associated with a particular one of the instructions of the guidance template indicates whether the particular instruction has been completed during the telephone call;
    determining, by the one or more devices whether the instructions were completed during the telephone call based on the keywords from the telephone call; and
    when the instructions were not completed during the telephone call, prompting, by the one or more devices, the call center agent to specify why the instructions were not completed during the telephone call.

2. The method of claim 1, wherein selecting the particular guidance template includes determining whether multiple keywords, extracted from the audio stream, match keywords associated with the plurality of guidance templates.

3. The method of claim 1, wherein the keyword is extracted by converting the audio stream to text and identifying the keyword, amongst the converted text.

4. The method of claim 1, wherein the keyword is a word that is synonymous with one or more words spoken during the call.

5. The method of claim 1, wherein the graphical prompt includes a reference to a task of another graphical prompt previously provided to the call center agent.

6. The method of claim 1, wherein the graphical prompt includes at least one of:
   information about the agent,
   information about the caller,
   a task for the agent to complete,
   an indicator of whether the task has been completed,
   a link for contacting a supervisor of the agent,
   information corresponding to a third party, or
   a link for viewing information corresponding to the third party.

7. The method of claim 1, further comprising:
   creating the graphical prompt by populating a portion of the guidance template with at least a portion of the customer account information.

8. The method of claim 1, wherein the customer account information, associated with the caller, includes a geographic location associated with the caller, wherein the particular guidance template is selected further based on the geographic location associated with the caller.

9. A system, comprising:
   a non-transitory memory device storing a plurality of processor-executable instructions; and
   a processor configured to execute the processor-executable instructions, wherein executing the processor-executable instructions causes the processor to:
   receive a keyword extracted from an audio stream corresponding to a telephone call between an agent device of a call center agent and a caller device of a caller, the keyword being received during the telephone call,
   obtain, based on an identifier of the caller device obtained during the telephone call, customer account information associated with the caller and that predates the telephone call,
   select, based on the keyword and the customer account information, a particular guidance template, from a plurality of guidance templates that were generated prior to the telephone call, that is relevant to the audio stream of the telephone call,
   generate a graphical prompt pursuant to instructions of the selected particular guidance template, the selected instructions causing inclusion of at least some of the customer account information in the graphical prompt and the graphical prompt displaying information for assisting the call center agent with the telephone call, and
   provide the selected particular graphical prompt to the call center agent during the telephone call, the graphical prompt including the at least some of the customer account information in accordance with the instructions of the selected particular guidance template,
   monitor the telephone call, after providing the graphical prompt to the call center agent, based on keywords from the telephone call and instructions of the guidance template corresponding to the graphical prompt;
   present, during the telephone call and based on the monitoring, a visual indicator in the graphical prompt, for each instruction of the guidance template, wherein a particular visual indicator associated with a particular one of the instructions of the guidance template indicates whether the particular instruction has been completed during the telephone call;
   determine whether the instructions were completed during the telephone call based on the keywords from the telephone call; and
   when the instructions were not completed during the telephone call, prompt the call center agent to specify why the instructions were not completed during the telephone call.

10. The system of claim 9, wherein executing the processor-executable instructions, to select the particular guidance template, includes matching multiple keywords, extracted from the audio stream, to keywords associated with the plurality of guidance templates.

11. The system of claim 9, wherein the keyword is extracted by converting the audio stream to text and identifying the keyword, amongst the converted text.

12. The system of claim 9, wherein the keyword is a word that is synonymous with one or more words spoken during the call.

13. The system of claim 9, wherein the graphical prompt includes a reference to a task of another graphical prompt previously provided to the call center agent.

14. The system of claim 9, wherein the graphical prompt includes at least one of:
   information about the agent,
   information about the caller,
   a task for the agent to complete,
   an indicator of whether the task has been completed,
   a link for contacting a supervisor of the agent,
   information corresponding to a third party, or
   a link for viewing information corresponding to a third party.

15. The system of claim 9, wherein executing the processor-executable instructions further causes the processor to:
   create the graphical prompt by populating a portion of the guidance template with at least a portion of the customer account information.

16. The system of claim 9, wherein the customer account information, associated with the caller, includes a geographic location associated with the caller, wherein the particular guidance template is selected further based on the geographic location associated with the caller.

17. A non-transitory computer-readable medium storing instructions, which, when executed by one or more processors associated with a device, cause the one or more processors to:
   receive a keyword extracted from an audio stream corresponding to a telephone call between an agent device of a call center agent and a caller device of a caller, the keyword being received during the telephone call;
   obtain, by the one or more devices and based on an identifier of the caller device obtained during the telephone call, customer account information associated with the caller and predating the telephone call;
   select, by the one or more devices and based on the keyword and the customer account information, a particular guidance template, from a plurality of guidance templates that were generated prior to the telephone call, that is relevant to the audio stream of the telephone call;
   generate a graphical prompt pursuant to instructions of the guidance template, the selected instructions causing inclusion of at least some of the customer account information in the graphical prompt and the graphical prompt displaying information for assisting the call center agent with the telephone call;

provide the graphical prompt to the call center agent during the telephone call, the graphical prompt including the at least some of the customer account information in accordance with the instructions of the selected guidance template;

monitor the telephone call, after providing the graphical prompt to the call center agent, based on keywords from the telephone call and instructions of the guidance template corresponding to the graphical prompt;

present, during the telephone call and based on the monitoring, a visual indicator in the graphical prompt, for each instruction of the guidance template, wherein a particular visual indicator associated with a particular one of the instructions of the guidance template indicates whether the particular instruction has been completed during the telephone call;

determine whether the instructions were completed during the telephone call based on the keywords from the telephone call; and when the instructions were not completed during the telephone call, prompt the call center agent to specify why the instructions were not completed during the telephone call.

18. The non-transitory computer-readable medium of claim 17, wherein the keyword is extracted by converting the audio stream to text and identifying the keyword, amongst the converted text.

19. The non-transitory computer-readable medium of claim 17, wherein executing the plurality of instructions further causes the one or more processors to:

create the graphical prompt by populating a portion of the guidance template with at least a portion of the customer account information.

20. The non-transitory computer-readable medium of claim 17, wherein the customer account information, associated with the caller, includes a geographic location associated with the caller, wherein the particular guidance template is selected further based on the geographic location associated with the caller.

* * * * *